US012508611B2

(12) United States Patent
Ebertowski et al.

(10) Patent No.: US 12,508,611 B2
(45) Date of Patent: Dec. 30, 2025

(54) CONNECTOR SYSTEM FOR HAND-HELD SPRAY GUNS

(71) Applicant: 3M INNOVATIVE PROPERTIES COMPANY, St. Paul, MN (US)

(72) Inventors: Alexander T. Ebertowski, St. Paul, MN (US); Andrew R. Henry, Twyford (GB); Stephen C.P. Joseph, Woodbury, MN (US); Anna M. Hegdahl, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 579 days.

(21) Appl. No.: 17/862,288

(22) Filed: Jul. 11, 2022

(65) Prior Publication Data

US 2022/0347703 A1 Nov. 3, 2022

Related U.S. Application Data

(63) Continuation of application No. 16/069,851, filed as application No. PCT/US2017/013135 on Jan. 12, 2017, now Pat. No. 11,413,636.

(60) Provisional application No. 62/279,619, filed on Jan. 15, 2016, provisional application No. 62/322,492, filed on Apr. 14, 2016.

(51) Int. Cl.
*B05B 7/24* (2006.01)

(52) U.S. Cl.
CPC .......... *B05B 7/2408* (2013.01); *B05B 7/2478* (2013.01)

(58) Field of Classification Search
CPC .............................. B05B 7/2408; B05B 7/241
USPC .................................................. 239/302, 600
See application file for complete search history.

(56) References Cited

U.S. PATENT DOCUMENTS

| | | | |
|---|---|---|---|
| 1,395,965 | A | 11/1921 | McLean et al. |
| 1,732,691 | A | 10/1929 | Mueller et al. |
| 1,968,173 | A | 7/1934 | Russell |

(Continued)

FOREIGN PATENT DOCUMENTS

| | | | |
|---|---|---|---|
| CA | 2466801 | C | 7/2011 |
| DE | 890223 | C | 9/1953 |

(Continued)

OTHER PUBLICATIONS

"CanConnect—Handheld 1 Quart Can Adapter", Graco, 2014, pp. 1-2.

(Continued)

*Primary Examiner* — Cody J Lieuwen

(57) ABSTRACT

Spray gun reservoir components are disclosed. The spray gun reservoir component includes a liquid outlet and an outer face, and defines a centerline plane and an attachment plane. The liquid outlet surrounds a longitudinal axis. The outer face extends away from the liquid outlet. The centerline plane passes through the longitudinal axis. The attachment plane is defined orthogonally to the longitudinal axis and the centerline plane. The outer face further comprises a retention feature extending away from the centerline plane and generally parallel to the attachment plane. In some embodiments, the spray gun reservoir component further comprises a bearing surface formed on the outer face along the attachment plane to engage with a corresponding bearing surface on a liquid spray gun attachment point, with the bearing surface comprising the retention feature.

6 Claims, 28 Drawing Sheets

(56) References Cited

U.S. PATENT DOCUMENTS

| | | | |
|---|---|---|---|
| 2,004,574 | A | 6/1935 | Gee, Jr. |
| 2,037,240 | A | 4/1936 | Johnson |
| 3,083,883 | A | 4/1963 | Glidden |
| D200,960 | S | 4/1965 | Beinert |
| 3,271,059 | A | 9/1966 | Pearson |
| D217,609 | S | 5/1970 | Vicknair |
| 3,942,680 | A | 3/1976 | Seeley et al. |
| D252,156 | S | 6/1979 | Tabony et al. |
| 4,622,002 | A | 11/1986 | Bormüth |
| 4,858,777 | A | 8/1989 | Morel |
| D315,781 | S | 3/1991 | Hart et al. |
| 5,150,804 | A | 9/1992 | Blanchet et al. |
| 5,240,133 | A | 8/1993 | Thomas, Jr. |
| 5,611,443 | A | 3/1997 | King |
| 6,053,429 | A | 4/2000 | Chang |
| 6,435,426 | B1 | 8/2002 | Copp, Jr. |
| 6,547,161 | B1 | 4/2003 | Huang |
| D474,528 | S | 5/2003 | Huang |
| 6,588,681 | B2 | 7/2003 | Rothrum et al. |
| 6,595,441 | B2 | 7/2003 | Petrie et al. |
| 6,662,411 | B2 | 12/2003 | Rubenstein et al. |
| 6,938,836 | B2 | 9/2005 | Bouic |
| 6,953,155 | B2 | 10/2005 | Joseph |
| 7,032,839 | B2 | 4/2006 | Blette et al. |
| 7,036,752 | B1 | 5/2006 | Hsiang |
| 7,083,119 | B2 | 8/2006 | Bouic et al. |
| 7,188,785 | B2 | 3/2007 | Joseph et al. |
| D542,376 | S | 5/2007 | Blette et al. |
| 7,353,973 | B2 | 4/2008 | Rohr |
| D574,926 | S | 8/2008 | Huang |
| 7,410,106 | B2 | 8/2008 | Escoto, Jr. et al. |
| 7,513,443 | B2 | 4/2009 | Escoto, Jr. et al. |
| D607,807 | S | 1/2010 | Ohlhorst |
| 7,694,896 | B2 | 4/2010 | Turnbull et al. |
| D616,961 | S | 6/2010 | Goetz |
| 7,789,324 | B2 | 9/2010 | Bouic et al. |
| 7,819,341 | B2 | 10/2010 | Schmon et al. |
| 7,832,567 | B2 | 11/2010 | Joseph |
| D640,587 | S | 6/2011 | Tanaka |
| D642,863 | S | 8/2011 | Tobias |
| 8,016,209 | B2 | 9/2011 | Hess et al. |
| 8,033,413 | B2 | 10/2011 | Gerson et al. |
| 8,066,205 | B2 | 11/2011 | Bass et al. |
| D656,583 | S | 3/2012 | Hudson, Jr. et al. |
| 8,127,963 | B2 | 3/2012 | Gerson et al. |
| 8,196,770 | B2 | 6/2012 | Kosmyna et al. |
| D679,146 | S | 4/2013 | Rincon |
| 8,444,067 | B2 | 5/2013 | Schmon et al. |
| D692,530 | S | 10/2013 | Gehrung |
| 8,590,809 | B2 | 11/2013 | Escoto, Jr. et al. |
| D697,583 | S | 1/2014 | Schmon et al. |
| D705,899 | S | 5/2014 | Abernethy et al. |
| 8,844,840 | B2 | 9/2014 | Lawrence |
| 8,857,649 | B2 | 10/2014 | Buchholz |
| D717,104 | S | 11/2014 | Redfern |
| D719,637 | S | 12/2014 | Pagliai |
| 8,925,836 | B2 | 1/2015 | Dettlaff et al. |
| 8,944,351 | B2 | 2/2015 | Pellegrino et al. |
| 8,998,018 | B2 | 4/2015 | Pellegrino et al. |
| 9,038,674 | B2 | 5/2015 | Steele |
| D739,242 | S | 9/2015 | Pitera et al. |
| 9,162,240 | B2 | 10/2015 | Gerson et al. |
| 9,174,231 | B2 | 11/2015 | Shultz et al. |
| D747,497 | S | 1/2016 | Bell |
| 9,227,208 | B2 | 1/2016 | Lin |
| D755,345 | S | 5/2016 | Lüthi |
| D755,575 | S | 5/2016 | Pratt |
| 9,335,198 | B2 | 5/2016 | Pellegrino et al. |
| D758,533 | S | 6/2016 | Dettlaff |
| D779,632 | S | 2/2017 | Johnson et al. |
| 9,586,220 | B2 | 3/2017 | Pellegrino et al. |
| D792,556 | S | 7/2017 | Hegdahl et al. |
| D793,530 | S | 8/2017 | Hegdahl et al. |
| D793,531 | S | 8/2017 | Hegdahl et al. |
| 9,815,076 | B2 | 11/2017 | Schulz et al. |
| D811,525 | S | 2/2018 | Hegdahl et al. |
| 2003/0006310 | A1 | 1/2003 | Rothrum et al. |
| 2003/0198502 | A1 | 10/2003 | Maloney et al. |
| 2003/0209573 | A1 * | 11/2003 | Bouic .................. B05B 7/2478 222/541.1 |
| 2004/0256484 | A1 | 12/2004 | Joseph et al. |
| 2005/0092770 | A1 | 5/2005 | Yechouron |
| 2005/0139621 | A1 | 6/2005 | Foster |
| 2005/0156058 | A1 | 7/2005 | Kosmyna et al. |
| 2006/0000927 | A1 | 1/2006 | Ruda |
| 2006/0102550 | A1 | 5/2006 | Joseph et al. |
| 2006/0175433 | A1 * | 8/2006 | Escoto, Jr. ............. B05B 7/241 239/377 |
| 2006/0196891 | A1 * | 9/2006 | Gerson ................ B05B 7/2481 222/105 |
| 2006/0251473 | A1 | 11/2006 | Tyski |
| 2007/0131793 | A1 | 6/2007 | Joseph |
| 2007/0158348 | A1 | 7/2007 | Kosmyna et al. |
| 2007/0158361 | A1 | 7/2007 | Koyama |
| 2007/0272323 | A1 | 11/2007 | Verhaeghe |
| 2008/0011879 | A1 | 1/2008 | Gerson et al. |
| 2008/0223087 | A1 | 9/2008 | Veldman |
| 2009/0200309 | A1 | 8/2009 | Kosmyna et al. |
| 2010/0288772 | A1 | 11/2010 | Wambeke et al. |
| 2010/0288787 | A1 | 11/2010 | Jäckel |
| 2011/0108579 | A1 | 5/2011 | Martorell Pena et al. |
| 2012/0000992 | A1 | 1/2012 | Shih |
| 2012/0273583 | A1 * | 11/2012 | Gerson ................ B05B 7/2481 222/105 |
| 2012/0279609 | A1 | 11/2012 | Pellegrino et al. |
| 2012/0282009 | A1 | 11/2012 | Geuther |
| 2012/0291890 | A1 | 11/2012 | Pan |
| 2013/0001322 | A1 | 1/2013 | Pellegrino et al. |
| 2013/0105598 | A1 | 5/2013 | Shultz et al. |
| 2013/0153683 | A1 | 6/2013 | Lawrence |
| 2013/0186981 | A1 | 7/2013 | Burns |
| 2013/0221130 | A1 | 8/2013 | Joseph et al. |
| 2014/0014741 | A1 | 1/2014 | Escoto, Jr. et al. |
| 2014/0103143 | A1 | 4/2014 | Lin |
| 2014/0178126 | A1 | 6/2014 | Burns |
| 2014/0203098 | A1 | 7/2014 | Bierie |
| 2015/0060568 | A1 | 3/2015 | Johnson et al. |
| 2015/0108135 | A1 | 4/2015 | Hanna et al. |
| 2015/0360812 | A1 | 12/2015 | Gerson et al. |
| 2016/0052002 | A1 | 2/2016 | Schulz et al. |
| 2016/0271632 | A1 | 9/2016 | Bierie |
| 2016/0303594 | A1 | 10/2016 | Nyaribo et al. |
| 2017/0203887 | A1 | 7/2017 | Hegdahl et al. |

FOREIGN PATENT DOCUMENTS

| | | | |
|---|---|---|---|
| DE | 2209166 | | 9/1973 |
| DE | 20202123 | U1 | 2/2003 |
| DE | 202004003116 | U1 | 7/2005 |
| DE | 102009034715 | A1 | 1/2011 |
| DE | 102007039106 | B4 | 6/2022 |
| EP | 1566223 | B1 | 11/2007 |
| EP | 2383044 | A1 | 11/2011 |
| EP | 2450108 | B1 | 11/2016 |
| EP | 2982443 81 | | 4/2017 |
| JP | 3052058 | B2 | 6/2000 |
| NL | 1033999 | C2 | 12/2008 |
| WO | WO 97/26210 | | 7/1997 |
| WO | 1998032539 | A1 | 7/1998 |
| WO | 2003045575 | A1 | 6/2003 |
| WO | 2004037433 | A1 | 5/2004 |
| WO | 2004052552 | A1 | 6/2004 |
| WO | 2005018815 | A2 | 3/2005 |
| WO | 2007037921 | A1 | 4/2007 |
| WO | 2008156357 | A1 | 12/2008 |
| WO | 2009090273 | A1 | 7/2009 |
| WO | 2011047876 | A2 | 4/2011 |
| WO | 2014182722 | A1 | 11/2014 |
| WO | 2014182871 | A1 | 11/2014 |
| WO | 2016081977 | A1 | 6/2016 |
| WO | 2017123708 | A1 | 7/2017 |

(56) References Cited

FOREIGN PATENT DOCUMENTS

| | | | |
|---|---|---|---|
| WO | 2017123709 | A1 | 7/2017 |
| WO | 2017123714 | A1 | 7/2017 |
| WO | 2017123715 | A1 | 7/2017 |

OTHER PUBLICATIONS

"Otto House. Mixing Cup & Connector", 1 page.
"Paint & Solvent Solutions", Rummy Recycling Technologies Inc., 2004, pp. 1-5.
"Xforce HD. Heavy Duty Cordless Airless Sprayer Optimized for Protective and Marine Coatings", Graco BVBA, 2012, pp. 1-4.
"Paint & Solvent Solutions", Photograph, Rummy Recycling Technologies Inc., Scanned in Feb. 2006, 1 page.
Devilbiss, 'Gunner Cup. Conversion Adapter', 2011, p. 1.
International Search report for PCT International Application No. PCT/US2017/013135 malled on Jun. 13, 2017, 7 pages.
Kenna, "Eccentricity In Ellipses", Mathematics Magazine, 1959, vol. 32, No. 03, pp. 133-135.
Yotirama Coating With Paint, pp. 1-2.
Harry Pruner and Wolfgang Nesch, Understanding Injection Molds, Hanser Publishers, Munich, Hanser Gardner Publications, Cincinnati, pp. 28-30, 2013.
E. Alfredo Campo, The Complete Part Design Handbook, for Injection Molding of Thermoplastics, Hanser Publishers, Munich, Hanser Gardner Publications, Cincinnati, pp. 230-231, 607-608, 2006.
Gunter Erhard, Literature: Erhard: Konstruieren mit Kunststoffen, Hanser, pp. 290, 2008.
Image replacement of a cup lid archived in the El archive in 2011 from Gerson (images V#1-1 to V#1-11).
Image replacement of a 3M cup lid archived in the El archive in 2014. (PPS System) (views V#2-1 to V#2-12) and product catalogue #4-13, Publication 2015.
Images of a 3M cup lid archived in 2011' in the El archive with a separate refill opening—views V#3-1 to V#3-11.
YouTube video V#4 of a Norton cup system (release Jan. 6, 2015).
YouTube viceo V#5-1 of a cup system from 3M (publication Aug. 23, 2011).

* cited by examiner

CONNECTOR SYSTEM FOR HAND-HELD SPRAY GUNS

CROSS REFERENCE TO RELATED APPLICATIONS

This application is a continuation of U.S. application Ser. No. 16/069,851, filed Jul. 12, 2018, which claims the benefit of U.S. Application No. 62/279,619, filed Jan. 15, 2016 and U.S. Application No. 62/322,492, filed Apr. 14, 2016, the disclosures of which are incorporated by reference in their entirety herein.

BACKGROUND

The present disclosure relates to liquid spraying apparatuses, such as spray guns. More particularly, it relates to the connection between a spray gun and a reservoir containing the liquid to be sprayed.

Spray guns are widely used in vehicle body repair shops when re-spraying a vehicle that has been repaired following an accident. In the known spray guns, the liquid is contained in a reservoir attached to the gun from where it is fed to a spray nozzle. On emerging from the spray nozzle, the liquid is atomized and forms a spray with compressed air supplied to the nozzle. The liquid may be gravity fed or suction fed or, more recently, pressure fed by an air bleed line to the reservoir from the compressed air line to the spray gun, or from the spray gun itself.

SUMMARY

Traditionally, the liquid is contained in a rigid reservoir or pot removably mounted on the spray gun. In this way, the pot can be removed for cleaning or replacement. Previously, the pot was secured to the gun empty and provided with a removable lid by which the desired liquid could be added to the pot while attached to the gun. On completion of spraying, the pot can be removed and the gun and pot cleaned for re-use.

More recently, reservoir assemblies have been developed that enable painters to mix less paint and drastically reduce the amount of technician time required for gun cleaning. The PPS™ Paint Preparation System available from 3M Company of St. Paul, MN provides a reservoir that eliminates the need for traditional mixing cups and paint strainers. The PPS™ Paint Preparation System reservoir includes a reusable outer container or cup, an open-topped liner and a lid. The liner fits into the outer container, and paint (or other liquid) that is to be sprayed is contained within the liner. The lid is assembled with the liner and provides a spout or conduit through which the contained paint is conveyed. In use, the liner collapses as paint is withdrawn and, after spraying, the liner and lid can be removed allowing a new, clean liner and lid to be employed for the next use of the spray gun. As a result, the amount of cleaning required is considerably reduced and the spray gun can be readily adapted to apply different paints (or other sprayable coatings) in a simple manner.

Regardless of exact format, the reservoir or pot incorporates one or more connection features that facilitate removable assembly or attachment to the spray gun. In many instances, the spray gun and reservoir are designed in tandem, providing complementary connection formats that promote direct assembly of the reservoir to the spray gun. In other instances, an adaptor is employed between the reservoir and spray gun. The adaptor has a first connection format at one end that is compatible with the spray gun inlet and a second connection format at an opposite end that is compatible with the reservoir outlet. Screw thread-type connection formats are commonly used. Other connection formats have also been suggested, such as a releasable quick-fit connection employing bayonet type formations that are engageable with a push-twist action requiring less than one complete turn of the reservoir to connect/disconnect the reservoir as described, for example, in U.S. Application Publication No. 2013/0221130 the entire teachings of which are incorporated herein by reference. To minimize the possibility of accidental release of the reservoir or diminished fluid-tight seal between the reservoir and spray gun, it has further been suggested to incorporate security clips into the complimentary connection format as described in U.S. Pat. No. 7,083,119, the entire teachings of which are incorporated herein by reference. While these and other connection formats have improved the ease and confidence of removable connection between the reservoir and spray gun, opportunities for improvement remain.

The inventors of the present disclosure recognized that a need exists for reservoir components and for a spray gun reservoir connector system that overcomes one or more of the above-mentioned problems.

Some aspects of the present disclosure are directed toward a spray gun reservoir component. The spray gun reservoir component includes a liquid outlet and an outer face, and defines a centerline plane and an attachment plane. The liquid outlet surrounds a longitudinal axis. The outer face extends away from the liquid outlet. The centerline plane passes through the longitudinal axis. The attachment plane is defined orthogonally to the longitudinal axis and the centerline plane. The outer face further comprises a retention feature extending away from the centerline plane and generally parallel to the attachment plane. In some embodiments, the spray gun reservoir component further comprises a bearing surface formed on the outer face along the attachment plane to engage with a corresponding bearing surface on a liquid spray gun attachment point, with the bearing surface comprising the retention feature.

Other aspects of the present disclosure are directed toward a spray gun reservoir connector system. The system includes a reservoir, a spray gun inlet, a first connector format and a second connector format. The first connector format is provided with one of the reservoir and the spray gun inlet; the second connector format is provided with the other of the reservoir and the spray gun inlet. The first connector format includes at least one undercut and at least one contact surface. The contact surface defines a ramp region. The second connector format includes at least one undercut and at least one contact face. The contact face defines a ramp section. The connector formats have a complementary construction such that upon alignment and rotation of the reservoir relative to the spray gun inlet about a common longitudinal axis, an interface between the ramp region and ramp section alters a spatial relationship of the reservoir and spray gun inlet relative to one another in a direction of the longitudinal axis. As the reservoir is rotated on to the spray gun inlet (and/or vice-versa), the ramping surfaces (i.e., the ramp region and ramp section) guide the undercut features of the lid into the mating undercut features spray gun inlet. The mated relationship provides retention of the reservoir and spray gun inlet relative to one another, and offers stability of the reservoir on the spray gun inlet in an axis perpendicular to the longitudinal axis. In other embodiments, the connector formats further include one or more additional retention features that selectively lock the reservoir and the spray gun inlet relative to one another.

Other aspects of the present disclosure are directed toward a reservoir component of a reservoir containing a supply of liquid for delivery to a spray gun. The reservoir component includes the first connector format described above. In some embodiments, the reservoir component is a plastic injection molded part, with the undercut being aligned with the tool slide axis of an injection molding tool utilized to generate the reservoir component. In other embodiments, the reservoir component is a lid.

Yet other aspects of the present disclosure are directed toward a spray gun inlet for fluidly connecting a reservoir of liquid to an interior spray conduit of a spray gun. The spray gun inlet includes the second connector format described above. In some embodiments, the spray gun inlet is integrally formed with a spray gun. In other embodiments, the spray gun inlet is provided as part of an adaptor.

Yet other aspects of the present disclosure are directed toward:

Embodiment 1. A spray gun reservoir component comprising:
- a liquid outlet surrounding a longitudinal axis;
- an outer face extending away from the liquid outlet;
- a centerline plane passing through the longitudinal axis; and
- an attachment plane defined orthogonally to the longitudinal axis and the centerline plane;
- wherein the outer face comprises a retention feature extending away from the centerline plane and generally parallel to the attachment plane.

Embodiment 2. The spray gun reservoir component of Embodiment 1, wherein the retention feature is recessed within the outer face.

Embodiment 3. The spray gun reservoir component of Embodiment 1, wherein the retention feature protrudes from the outer face.

Embodiment 4. The spray gun reservoir component of any of Embodiments 1-3, wherein a retention feature angle α is defined between the centerline plane and a stop surface of the retention feature, and further wherein the retention feature angle α is not less than 90 degrees.

Embodiment 5. The spray gun reservoir component of Embodiment 4, wherein the stop surface is accessible within the span of the retention feature angle α and from a receiving direction defined generally along the attachment plane.

Embodiment 6. The spray gun reservoir component of any of Embodiments 1-5, further comprising a bearing surface formed on the outer face along the attachment plane to engage with a corresponding bearing surface on a liquid spray gun attachment point, the bearing surface comprising the retention feature.

Embodiment 7. The spray gun reservoir component of Embodiment 6, wherein the retention feature is recessed within the bearing surface.

Embodiment 8. The spray gun reservoir component of Embodiment 6 wherein the retention feature protrudes from the bearing surface.

Embodiment 9. The spray gun reservoir component of any of Embodiments 1-8, wherein the retention feature comprises an axial retention surface disposed at an acute angle relative to the attachment plane such that a trapping region is formed between the axial retention surface and the outer face.

Embodiment 10. The spray gun reservoir component of Embodiment 9, wherein the axial retention surface serves as the stop surface.

Embodiment 11. The spray gun reservoir component of any of Embodiments 1-10, wherein the liquid outlet is formed in a spout protruding from the outer surface.

Embodiment 12. The spray gun reservoir component of any of Embodiments 1-10, wherein the liquid outlet is recessed within the outer face.

Embodiment 13. A method of making a spray gun reservoir component including a liquid outlet surrounding a longitudinal axis, an outer face extending away from the liquid outlet, a centerline plane passing through the longitudinal axis, and an attachment plane defined orthogonally to the central axis and the centerline plane, the outer face comprising a retention feature extending away from the centerline plane and generally parallel to the attachment plane, the method comprising:
- providing plastic injection molding tooling including first and second tooling components collectively defining a cavity having a shape of the spray gun reservoir component;
- injecting molten plastic into the cavity to form the spray gun reservoir component; and
- sliding the first and second tooling components relative to one another to separate the first and second tooling components and release the spray gun reservoir component;
- wherein the step of sliding includes manipulating the first and second tooling components along a slide tool path that is aligned with the retention feature.

Embodiment 14. The method of Embodiment 13, wherein the retention feature is defined by an undercut formed in the outer face.

Embodiment 15. A spray gun inlet for selectively fluidly connecting a reservoir containing a supply of liquid to an interior spray conduit of a spray gun, the spray gun inlet comprising:
- a tubular member surrounding a central axis;
- a flange extending away from the tubular member;
- a centerline plane passing through the central axis; and
- an attachment plane defined orthogonally to the central axis and the centerline plane;
- wherein the flange comprises a retention feature extending away from the centerline plane and generally parallel to the attachment plane.

Embodiment 16. The spray gun inlet of Embodiment 15 wherein the spray gun inlet is provided on a detachable adapter.

Embodiment 17. The spray gun inlet of Embodiment 15 wherein the spray gun inlet is integral with the spray gun.

Embodiment 18. A method of attaching the spray gun reservoir component of any of Embodiments 1-12 to the spray gun inlet of any of Embodiments 15-17 comprising
- aligning the longitudinal axis of the spray gun reservoir component with the central axis of the spray gun inlet;
- engaging the retention feature of the spray gun reservoir component with the retention feature of the spray gun inlet.

Embodiment 19. A spray gun reservoir connector system comprising:
- a reservoir;
- a spray gun inlet;
- a first connector format provided with one of the reservoir and the spray gun inlet, the first connector format having a first connector structure including a first undercut and a first contact surface, wherein the first contact surface defines a ramp region; and
- a second connector format provided with the other of the reservoir and the spray gun inlet, the second connector format having a second connector structure including a first undercut and a first contact face, wherein the first contact face defines a ramp section;

wherein the connector formats have a complementary construction such that upon alignment of the reservoir with the spray gun inlet about a common longitudinal axis, an interface between the ramp region and ramp section upon rotation of the reservoir and spray gun inlet relative to one another alters a spatial relationship of the reservoir and spray gun inlet relative to one another in a direction of the longitudinal axis.

Embodiment 20. The connector system of Embodiment 19, wherein the first and second connector formats are configured to selectively provide a locked state in which the first undercut of the first connector structure is aligned with the first undercut of the second connector structure.

Embodiment 21. The connector system of Embodiment 20, wherein the first and second connector structures are configured to achieve the locked state upon rotation of the reservoir and the spray gun inlet relative to one another about the longitudinal axis.

Embodiment 22. The connector system of Embodiment 20, wherein the first undercut of the first connector structure defines a shoulder, and further wherein the first undercut of the second connector structure defines a finger, and even further wherein the locked state includes the shoulder abutting the finger.

Embodiment 23. The connector system of any of Embodiments 19-22, wherein the contact surface further includes a lead-in region.

Embodiment 24. The connector system of Embodiment 23, wherein a major plane of the lead-in region is substantially perpendicular to the longitudinal axis.

Embodiment 25. The connector system of Embodiment 24, wherein a major plane of the ramp region is orthogonal to the major plane of the lead-in region.

Embodiment 26. The connector system of Embodiment 24, wherein a geometry of the ramp region defines a partial helix shape.

Embodiment 27. The connector system of any of Embodiments 19-26, wherein the reservoir further includes a liquid outlet having a spout, and further wherein the connector format associated with the reservoir is radially spaced outside of the spout.

Embodiment 28. The connector system of any of Embodiments 19-27, wherein the spray gun inlet is on an adaptor adapted to connect to a spray gun.

Embodiment 29. The connector system of Embodiment 28, wherein the adaptor further includes a tubular member and a connector feature configured for connection to a spray gun inlet port.

Embodiment 30. The connector system of any of Embodiments 19-29, wherein the spray gun inlet is integral with a spray gun.

Embodiment 31. The connector system of any of Embodiments 19-30, wherein the first connector format further includes a first retention member, and further wherein the second connector format further includes a first lock structure.

Embodiment 32. The connector system of Embodiment 31, wherein the first retention member and the first lock structure are configured to such that the first retention member selectively engages the first lock structure upon rotation of the reservoir and the spray gun inlet relative to one another about the longitudinal axis.

Embodiment 33. The connector system of Embodiment 32, wherein the first retention member is circumferentially off-set from the first undercut of the first connector format.

Embodiment 34. The connector system of Embodiment 33, wherein the first retention member is aligned with the contact surface.

Embodiment 35. The connector system of any of Embodiments 19-34, wherein the first and second connector structures each include a plurality of undercuts.

Embodiment 36. The connector system of any of Embodiments 19-35, wherein the first connector structure further includes a second undercut and a second contact surface.

Embodiment 37. The connector system of Embodiment 36, wherein the first and second contact surfaces are identical.

Embodiment 38. The connector system of Embodiment 36, wherein a geometry of the second contact surface differs from a geometry of the first contact surface.

Embodiment 39. The connector system of Embodiment 36, wherein the first and second undercuts of the first connector structure are circumferentially off-set from one another.

Embodiment 40. The connector system of any of Embodiments 19-39, wherein the first connector format is provided as part of a component of the reservoir.

Embodiment 41. The connector system of Embodiment 40, wherein the component is a plastic injection molded part, and further wherein the first undercut of the first connector format is aligned with a slide tool path of an injection molding tool utilized to generate the component.

Embodiment 42. The connector system of Embodiment 40, wherein the component is a lid.

Embodiment 43. The connector system of any of Embodiments 19-42, wherein the first and second connector structures are configured to stabilize the reservoir and the spray gun inlet against rocking upon assembly of the reservoir to the spray gun inlet.

Embodiment 44. A reservoir component provided as part of a spray gun reservoir for containing a supply of liquid, the reservoir component comprising:

a connector format having a connector structure including a first undercut and a first contact surface, wherein the first contact surface defines a ramp region, and further wherein the first undercut is formed at an end of the ramp region;

wherein the connector structure is configured for mating interface with a complementary connector structure of a spray gun inlet.

Embodiment 45. The reservoir component of Embodiment 44, wherein a shape of the reservoir component defines a longitudinal axis, and further wherein a major plane of the ramp region is oblique with respect to the longitudinal axis.

Embodiment 46. The reservoir component of Embodiment 45, wherein a geometry of the ramp region defines a partial helix.

Embodiment 47. The reservoir component of Embodiment 45, wherein the first contact surface further defines a lead-in region extending from the ramp region opposite the first undercut, and further a major plane of the lead-in region is non-coplanar with the major plane of the ramp region.

Embodiment 48. The reservoir component of Embodiment 47, wherein the major plane of the lead-in region is substantially perpendicular to the longitudinal axis.

Embodiment 49. The reservoir component of any of Embodiments 44-48, wherein the connector format further includes a second undercut and a second contact surface.

Embodiment 50. The reservoir component of Embodiment 49, wherein the second undercut is circumferentially off-set from the first undercut.

Embodiment 51. The reservoir component of Embodiment 49, wherein the second undercut is formed at an end of the second contact surface.

Embodiment 52. The reservoir component of Embodiment 49, wherein the second undercut is formed at an end of the first contact surface opposite the first undercut.

Embodiment 53. The reservoir component of Embodiment 49, wherein a geometry of the first contact surface differs from a geometry of the second contact surface.

Embodiment 54. The reservoir component of Embodiment 49, wherein the second contact surface includes a ramp region.

Embodiment 55. The reservoir component of Embodiment 54, wherein the first and second contact surfaces have an identical geometry.

Embodiment 56. The reservoir component of any of Embodiments 44-55, wherein the connector format further includes at least one retention member apart from the connector structure and configured to selectively lock with a complementary lock structure provided with a spray gun inlet.

Embodiment 57. The reservoir component of any of Embodiments 44-56, wherein the reservoir component is a plastic injection molded part, and further wherein the first undercut is aligned with a slide tool path of an injection molding tool utilized to generate the component.

Embodiment 58. The reservoir component of any of Embodiments 44-57, wherein the reservoir component is a lid.

Embodiment 59. A spray gun inlet for selectively fluidly connecting a reservoir containing a supply of liquid to an interior spray conduit of a spray gun, the spray gun inlet comprising:

- a connector format having a connector structure including a first undercut and a first contact face, wherein the first contact face defines a ramp section, and further wherein the first undercut is formed at an end of the ramp section;
- wherein the connector structure is configured for mating interface with a complementary connector structure of a spray gun reservoir.

Embodiment 60. The spray gun inlet of Embodiment 59, wherein a shape of the spray gun inlet defines a central axis, and further wherein a major plane of the ramp section is oblique with respect to the central axis.

Embodiment 61. The spray gun inlet of Embodiment 60, wherein a geometry of the ramp section defines a partial helix.

Embodiment 62. The spray gun inlet of Embodiment 60, wherein the first contact face further defines a lead-in section extending from the ramp section opposite the first undercut, and further a major plane of the lead-in section is non-coplanar with the major plane of the ramp section.

Embodiment 63. The spray gun inlet of Embodiment 62, wherein the major plane of the lead-in section is substantially perpendicular to the central axis.

Embodiment 64. The spray gun inlet of any of Embodiments 59-63, wherein the connector format further includes a second undercut and a second contact face.

Embodiment 65. The spray gun inlet of Embodiment 64, wherein the second undercut is circumferentially off-set from the first undercut.

Embodiment 66. The spray gun inlet of Embodiment 64, wherein the second undercut is formed at an end of the second contact face.

Embodiment 67. The spray gun inlet of Embodiment 64, wherein the second undercut is formed at an end of the first contact face opposite the first undercut.

Embodiment 68. The spray gun inlet of Embodiment 64, wherein a geometry of the first contact face differs from a geometry of the second contact face.

Embodiment 69. The spray gun inlet of Embodiment 64, wherein the second contact face includes a ramp region.

Embodiment 70. The spray gun inlet of Embodiment 69, wherein the first and second contact faces have an identical geometry.

Embodiment 71. The spray gun inlet of any of Embodiments 59-70, wherein the connector format further includes at least one lock structure apart from the connector structure and configured to selectively lock with a complementary retention member provided with a reservoir.

Embodiment 72. The spray gun inlet of any of Embodiments 59-71, wherein the spray gun inlet is on an adaptor adapted to connect to a spray gun.

Embodiment 73. The spray gun inlet of Embodiment 72, wherein the adaptor further includes a tubular member and a connector feature configured for connection to a spray gun inlet port.

Embodiment 74. The spray gun inlet of any of Embodiments 59-73, wherein the spray gun inlet is integral with a spray gun.

The connector systems of the present disclosure facilitate simple and quick mounting (and removal) of a reservoir to a spray gun (either directly to the spray gun, or to an adaptor that in turn is mounted to the spray gun). The complementary connector formats are aligned then rotated relative to one another to achieve a locked, liquid sealed connection (it being understood that in some embodiments, a liquid seal may also be achieved prior to rotation).

As used herein, the term “liquid” refers to all forms of flowable material that can be applied to a surface using a spray gun (whether or not they are intended to color the surface) including (without limitation) paints, primers, base coats, lacquers, varnishes and similar paint-like materials as well as other materials, such as adhesives, sealer, fillers, putties, powder coatings, blasting powders, abrasive slurries, mold release agents and foundry dressings which may be applied in atomized or non-atomized form depending on the properties and/or the intended application of the material and the term “liquid” is to be construed accordingly.

DETAILED DESCRIPTION

Figure 1:
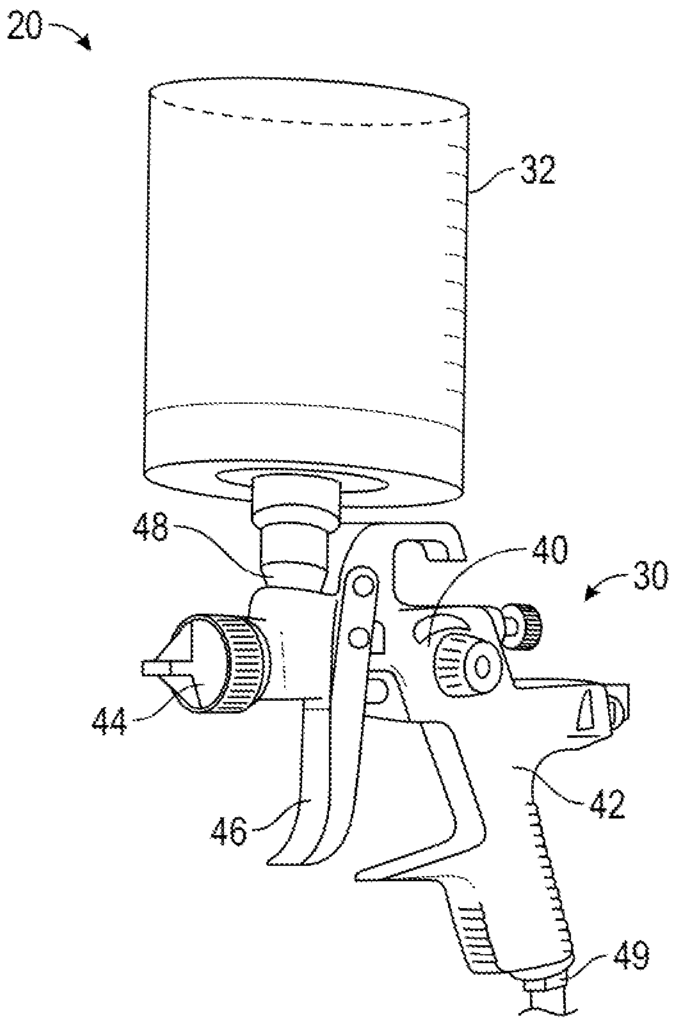
FIG. 1 is a simplified perspective view of a spray gun assembly including a spray gun and a reservoir.

Aspects of the present disclosure are directed toward connector systems that facilitate releasable, sealed connection between a spray gun and reservoir. By way of background, FIG. 1 depicts a spray gun paint system 20 including a spray gun 30 of a gravity-feed type and a reservoir 32. The gun 30 includes a body 40, a handle 42, and a spray nozzle 44 at a front end of the body 40. The gun 30 is manually operated by a trigger 46 that is pivotally mounted on the sides of the body 40. An inlet port 48 (referenced generally) is formed in or carried by the body 40, and is configured to establish a fluid connection between an interior spray conduit (hidden) of the spray gun 30 and the reservoir 32. The reservoir 32 contains liquid (e.g., paint) to be sprayed, and is connected to the inlet port 48 (it being understood that the connection implicated by the drawing of FIG. 1 does not necessarily reflect the connector systems of the present disclosure). In use, the spray gun 30 is connected via a connector 49 at a lower end of the handle 42 to a source of compressed air (not shown). Compressed air is delivered through the gun 30 when the user pulls on the trigger 46 and paint is delivered under gravity from the reservoir 32 through the spray gun 30 to the nozzle 44. As a result, the paint (or other liquid) is atomized on leaving the nozzle 44 to form a spray with the compressed air leaving the nozzle 44.

Figure 2:
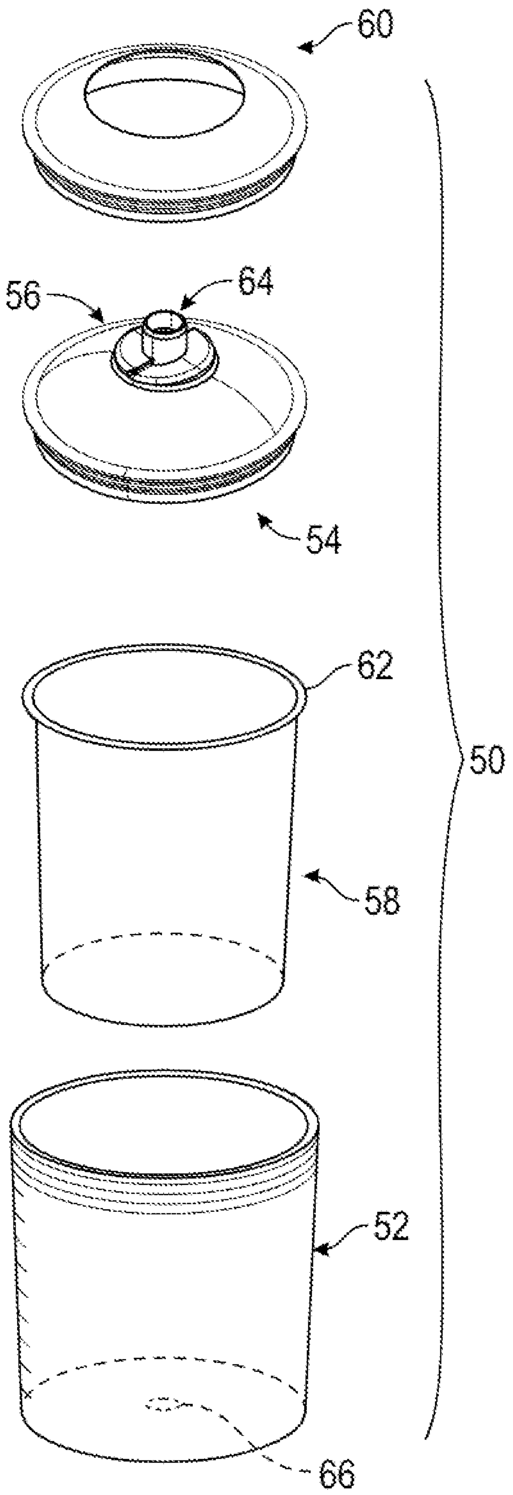
FIG. 2 is an exploded view of a reservoir incorporating a connection format in accordance with principles of the present disclosure.

For ease of illustration, connection formats of the present disclosure between the spray gun 30 and the reservoir 32 are not included with the drawing of FIG. 1. In general terms, the reservoir 32 includes one or more components establishing a first connection format for connection to the spray gun 30. A complementary, second connection format is included with an adaptor (not shown) assembled between the reservoir 32 and the inlet port 48, or with the spray gun 30. With this background in mind, FIG. 2 illustrates one non-limiting example of a reservoir 50 in accordance with principles of the present disclosure. The reservoir 50 includes an outer container 52 and a lid 54. The lid 54 includes or provides a first connection format or feature 56 (referenced generally) described in greater detail below. In other embodiments, the first connection format or feature 56 can be provided with any other component of the reservoir 50. That is to say, while the descriptions below describe connection formats of the present disclosure as part of a reservoir lid, the so-described connection formats can alternatively be provided with any other reservoir component apart from a lid. Remaining components of the reservoir 50 can assume various forms and are optional. For example, in some embodiments the reservoir 50 further includes a liner 58 and a collar 60. In general terms, the liner 58 fits within the interior of the container 52 and can have a narrow rim 62 at the open end which sits on the top edge of the container 52. The lid 54 is configured to fit onto or in the open end of the liner 58 to locate the peripheral edge of the lid 54 over the rim 62 of the liner 58. The lid/liner assembly is secured in place by the annular collar 60 that releasably engages the container 52 (e.g., threaded interface as shown, snap fit, etc.).

In addition to the connection format 56, the lid 54 forms a liquid outlet 64 (referenced generally) through which liquid contained by the liner 58 can flow. In use, the liner 58 collapses in an axial direction toward the lid 54 as paint is withdrawn from the reservoir 50. Air is permitted to enter the outer container (in this embodiment through an optional vent hole 66 in the outer container 52) as the liner 58 collapses. On completion of spraying, the reservoir 50 can be detached from the spray gun 30 (FIG. 1), the collar 60 released and the lid/liner assembly removed from the outer container 52 in one piece. The outer container 52 and the collar 60 are left clean and ready for re-use with a fresh liner 58 and lid 54. In this way, excessive cleaning of the reservoir 50 can be avoided.

In other embodiments, the reservoirs of the present disclosure need not include the liner 58 and/or the collar 60. In some embodiments, the reservoir need not include the outer container (for example, the lid and liner may be separable or removable from the outer container such that the outer container is not needed during spraying). The connection formats of the present disclosure can be implemented with these and/or a plethora of other reservoir configurations that may or may not be directly implicated by the figures.

Figure 3:
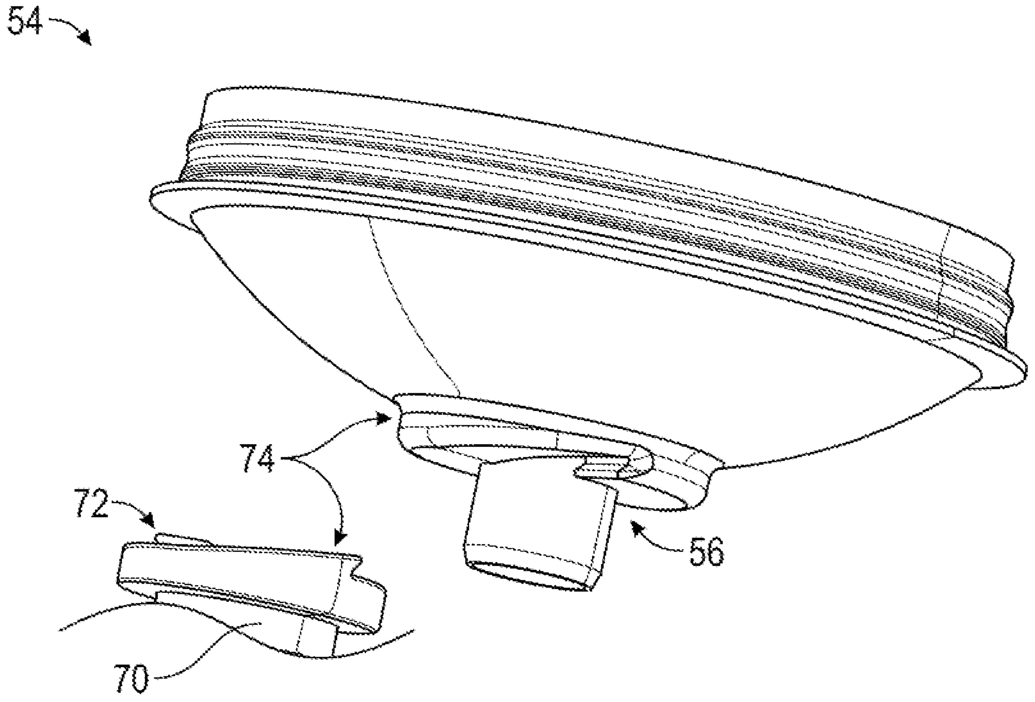
FIG. 3 is a perspective view of a portion of a spray gun reservoir connector system in accordance with principles of the present disclosure and including complimentary connection formats.

As mentioned above, the first connection format 56 provided with the lid 54 is configured to releasably connect with a complementary second connection format provided with a spray gun inlet or apparatus. As point of reference, FIG. 3 illustrates the lid 54 along with a portion of a spray gun inlet 70 that otherwise carries or provides a second complementary connection format 72 (referenced generally). The spray gun inlet 70 can be an adaptor, an integral portion of the spray gun 30 (FIG. 1), provided on a detachable spray head assembly of a spray gun (see, e.g., "spray head assembly 60" in U.S. Pat. No. 8,590,809 to Escoto, et al., the disclosure of which is hereby incorporated by reference in its entirety), etc. Regardless, the first and second connection formats 56, 72 are configured in tandem, promoting a releasable, liquid-tight sealed mounting or connection between the lid 54 and the spray gun inlet 70. In some embodiments, the first and second complementary connection formats 56, 72 can be viewed as collectively defining a spray gun reservoir connector system 74 in accordance with principles of the present disclosure.

Figure 4A:
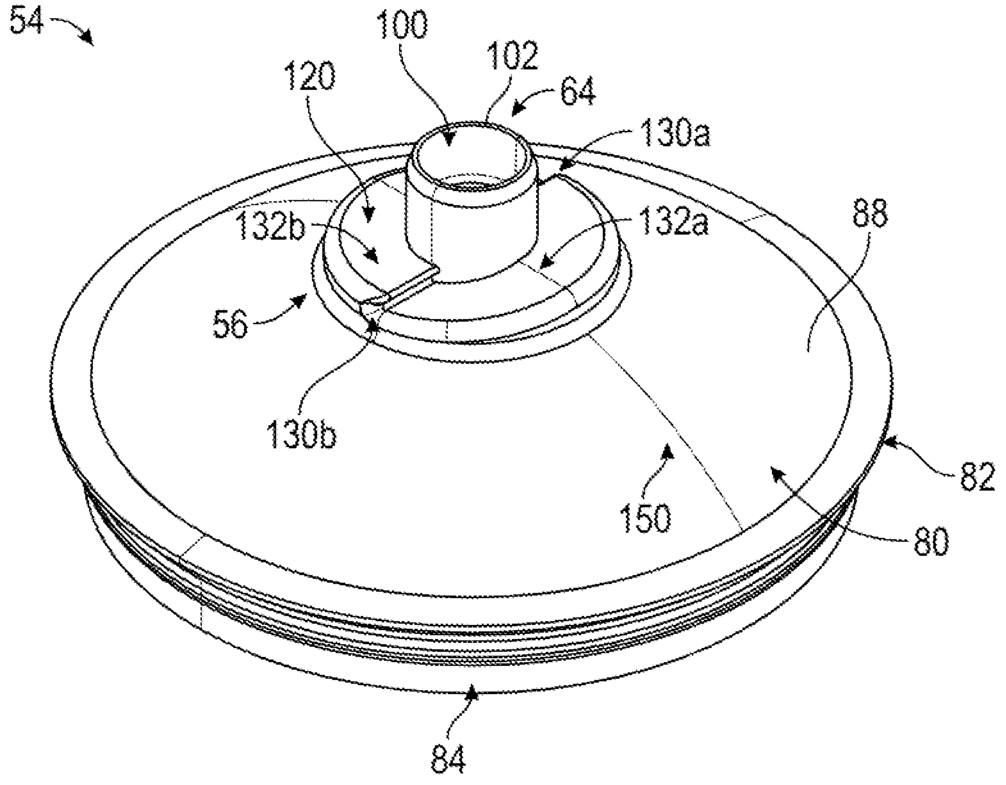
FIG. 4A is a perspective view of a lid portion of the reservoir of FIG. 3.
Figure 4B:
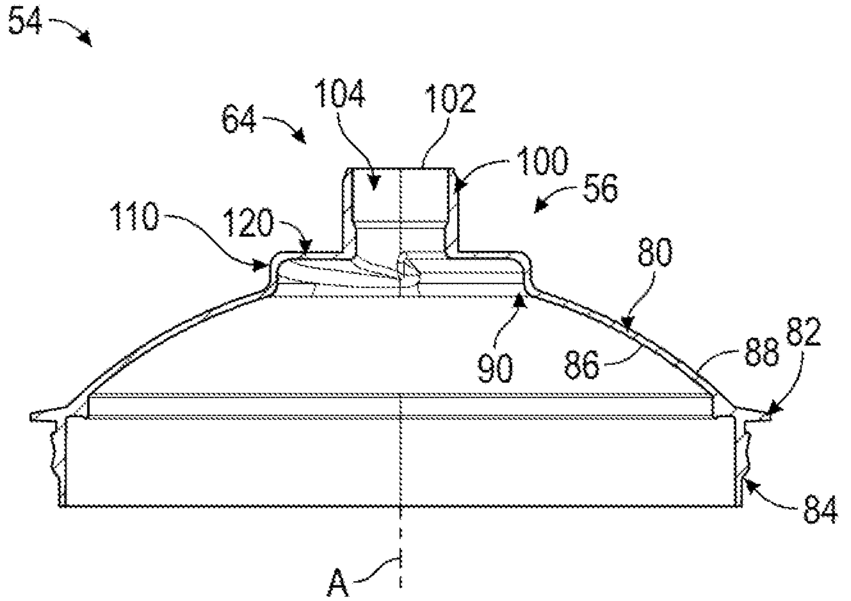
FIG. 4B is a cross-sectional view of the lid of FIG. 4A.

A mentioned above, the first connection format 56 can be provided as part of the lid 54. In some embodiments, and as shown in FIGS. 4A and 4B (otherwise illustrating the lid 54 in isolation), a shape of the lid 54 can be viewed as defining a longitudinal axis A. In addition to the first connection format 56 (referenced generally) and the liquid outlet 64, the lid 54 includes or defines a wall 80, a flange 82, and a hub 84. The wall 80 defines opposing, inner and outer faces 86, 88, with at least the outer face 88 of the wall 80 having, for example (but not limited to) the curved (e.g., hemispherical) shape implicated by the drawings. Finally, the wall 80 defines a central opening 90 (best seen in FIG. 4B) that is preferably co-axial with the longitudinal axis A. The flange 82 projects radially outwardly from a perimeter of the wall 80 opposite the central opening 90, and can be configured to interface with one or more other components of the reservoir 50 (FIG. 2), for example the outer container 52 (FIG. 2). In the embodiment shown, the hub 84 projects longitudinally (relative to the longitudinal axis A) from the flange 82 in a direction opposite the wall 80, and can be configured to interface with one or more other components of the reservoir 50, for example the liner 58 (FIG. 2). The wall 80, flange 82, and the hub 84 can assume a wide variety of other forms. Further, in other embodiments, one or both of the flange 82 and the hub 84 can be omitted.

The liquid outlet 64 includes a spout 100. The spout 100 is preferably co-axial with the longitudinal axis A, in this case projecting upwardly (relative to the orientation of FIGS. 4A and 4B) relative to the wall 80 and terminating at a leading surface 102. In other embodiments, the spout 100 may be contained within the body of the lid 54, or comprise a recess in the outer face 88 of the lid 54. The spout 100 defines a passage 104 (best seen in FIG. 4B) that is aligned with, and open to, the central opening 90. With this construction, liquid flow through the liquid outlet 64 (e.g., from a location within the confines of the inner face 86 of the wall 80 to a location external the spout 100) readily occurs through the central opening 90 and the passage 104.

In some embodiments, the liquid outlet 64 includes one or more additional features that can optionally be considered components of the first connection format 56. For example, the leading surface 102 can be configured to form a face seal with the complementary component or device (e.g., the spray gun inlet 70 of FIG. 3) upon assembly to the lid 54. The sealing relationship can be established by the leading surface 102 being substantially flat or planar (i.e., within 5% of a truly flat or planar shape) in a plane perpendicular to the longitudinal axis A, or tapered or chamfered and configured to seal against a corresponding tapered surface on the complementary component. Liquid tight seal(s) between the lid 54 and the spray gun inlet 70 can alternatively be promoted with a variety of other constructions that may or may not include the leading surface 102 (e.g., rings formed in or on the spout 100 or the complementary component, O-rings, a friction or interference fit, etc.).

Figure 5A:
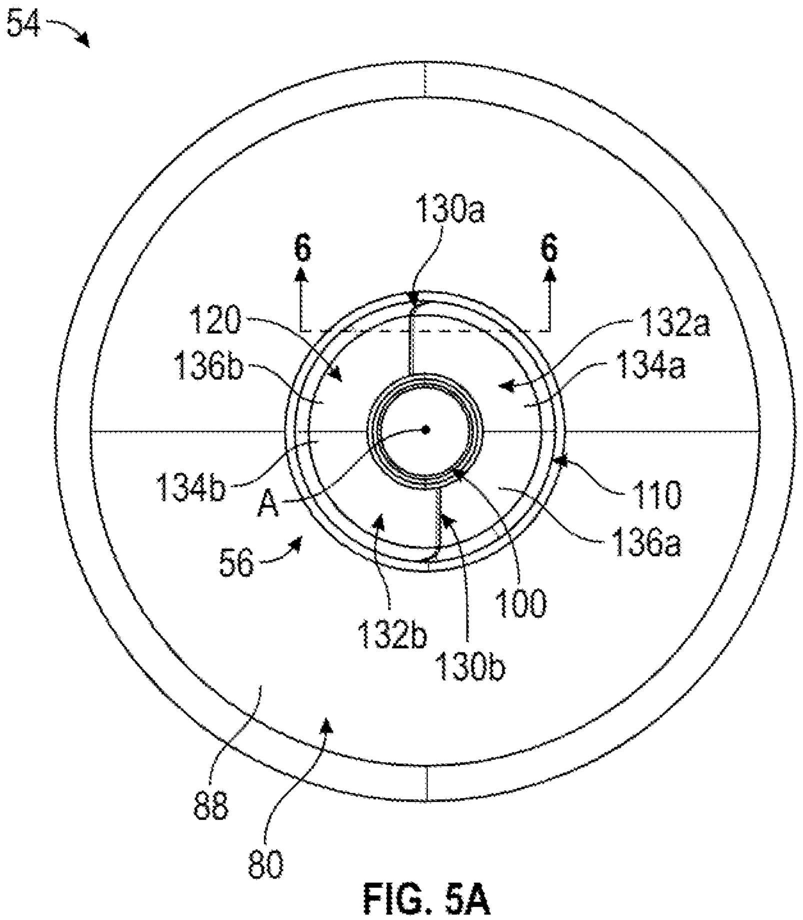
FIG. 5A is a top view of the lid of FIG. 4A.
Figure 5B:
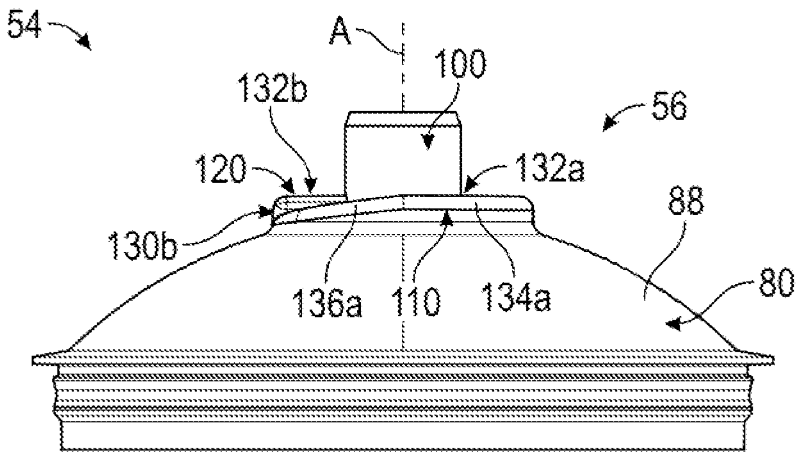
FIG. 5B is a front view of the lid of FIG. 4A.
Figure 5C:
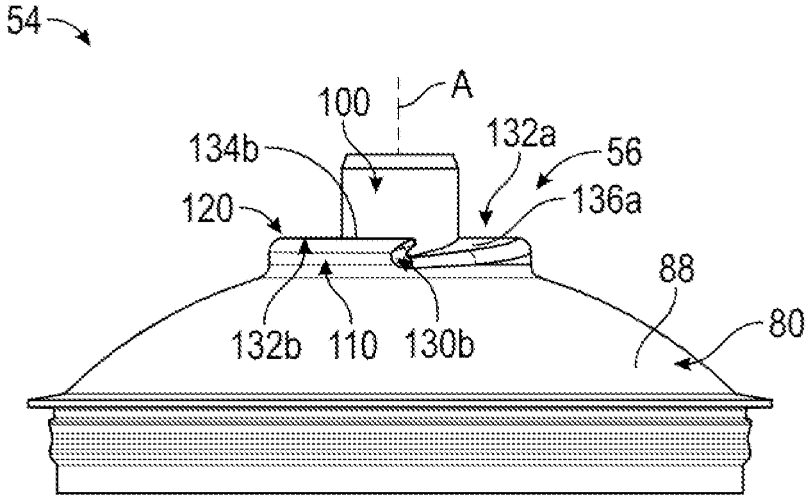
FIG. 5C is a side view of the lid of FIG. 4A.

Against the above background, and with additional reference to FIGS. 5A-5C, the first connection format 56 (referenced generally) includes a platform 110. The platform 110 can be viewed as a projection from the outer face 88 of the wall 80 at a location external the spout 100. In some embodiments, the wall 80 and the platform 110 can be formed as an integral, continuous structure, with a shape of the platform 110 representing a deviation from the curved shape defined by the wall 80 in extension from the flange 82. Further, and as best seen in FIG. 4B, the spout 100 and the platform 110 can also be formed as an integral, continuous structure in some embodiments. Regardless, the platform 110 is configured to facilitate selective connection or mounting with the second complementary connection format 72 (FIG. 3) as described below.

The platform 110 extends from the outer face 88 and terminates at a connector structure 120 (referenced generally). The connector structure 120 is configured to provide a sliding interface with the spray gun inlet (not shown), and can have a shape differing from the optional curved shape of the wall 80. The connector structure 120 circumferentially surrounds the spout 100 (e.g., the connector structure 120 revolves generally about the longitudinal axis A at a location radially exterior the spout 100). Geometry features of the connector structure 120 are configured to facilitate engagement with corresponding features of the complementary second connection format 72 (FIG. 3).

For example, one or more trapping regions or undercuts (such as first and second trapping regions or undercuts 130*a*, 130*b* illustrated in the non-limiting embodiment of FIGS. 4A-5C) are defined in the connector structure 120, along with one or more contact or bearing surfaces (such as first and second contact or bearing surfaces 132*a*, 132*b* illustrated in the non-limiting embodiment of FIGS. 4A-5C). With the non-limiting example shown in which two of the undercuts 130*a*, 130*b* and two of the contact surfaces 132*a*, 132*b* are provided, relative to a rotational direction defined by revolution of the connector structure 120 about the spout 100 (i.e., clockwise or counterclockwise), the first contact surface 132*a* extends circumferentially in the clockwise direction from the first undercut 130*a* to the second undercut 130*b* and has a geometry generating a lead-in region 134*a* and a ramp region 136*a*. Relative to the clockwise direction, then, the lead-in region 134*a* is "ahead" or "upstream" of the ramp region 136*a*. Similarly, the second contact surface 132*b* can extend circumferentially in the clockwise direction from the second undercut 130*b* to the first undercut 130*a*, and has a geometry generating a lead-in region 134*b* and a ramp region 136*b*. In yet other embodiments, the optional second contact surface 132*b* can have a construction differing from that of the first contact surface 132*a* and may or may not include one or both of the lead-in region 134*b* and the ramp region 136*b*. In yet other embodiments, where three or more of the contact surfaces (and/or three of the undercuts) are provided, the first contact surface 130*a* can have the lead-in region 134*a* and the ramp region 136*a*, whereas remaining ones of the contact surfaces can be identical to the first contact surface 130*a* or can have a different construction.

The contact surfaces 132*a*, 132*b* (where two are provided) can be substantially identical in some embodiments such that the following description of the first contact surface 132*a* applies equally to the second contact surface 132*b*. A major plane of the lead-in region 134*a* can be substantially flat (i.e., within 5% of a truly flat shape) and substantially perpendicular (i.e., within 5% of a truly perpendicular relationship) to the longitudinal axis A. The ramp region 136*a* tapers longitudinally downward (relative to the upright orientation of FIGS. 5B and 5C) in extension from the lead-in region 134*a* to the second undercut 130*a*, creating a partial helical shape. Thus, the lead-in region 134*a* is longitudinally or vertically "above" the ramp region 136*a* (relative to the upright orientation of FIGS. 5B and 5C), and a major plane of the ramp region 136*a* is oblique to the major plane of the lead-in region 134*a* (and is not substantially perpendicular to the longitudinal axis A). While the ramp regions 136*a*, 136*b* shown in, e.g., FIG. 6 are depicted as a linearly inclined, it should be understood that different trajectories are possible (e.g., curved or partially curved) within the scope of the present disclosure.

Figure 6:
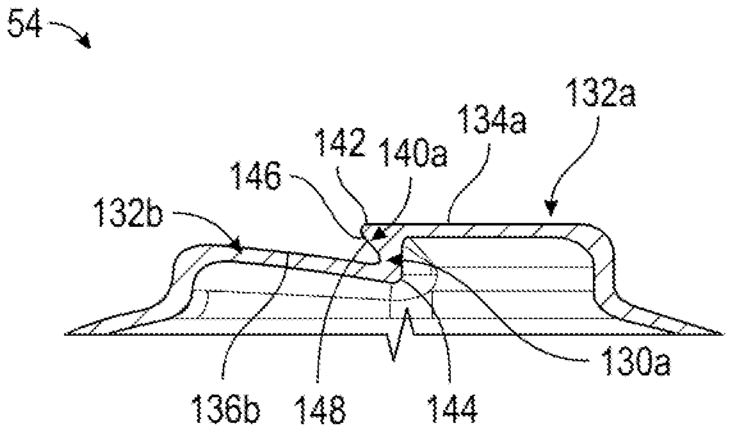
FIG. 6 is an enlarged cross-sectional view of a portion of the lid of FIG. 5A, taken along the line 6-6.

Geometry features generated by the first undercut 130*a* are provided by FIG. 6, it being understood that the second undercut 130*b* (FIG. 4A) (if provided) can have a substantially identical configuration. Commensurate with the above descriptions, the first undercut 130*a* is formed at, or defines, a transition between the ramp region 136*b* of the second contact surface 132*b* and the lead-in region 134*a* of the first contact surface 132*a*. A shoulder or retention feature 140*a* is defined by the undercut 130*a*, extending between a leading end 142 of the first contact surface 132*a* and a trailing end 144 of the second contact surface 132*b*. A major plane of the shoulder 140*a* is non-parallel relative to the major plane of the lead-in region 134*a* and relative to the major plane of the ramp region 136*b*, with the shoulder 140*a* projecting outwardly above the second contact surface ramp region 136*b*. A shape of the shoulder 140*a* can be viewed as defining an axial retention surface 146 and a stop surface 148.

Returning to FIGS. 4A-5C, while the first connection format 56 has been described as including two of the undercuts 130*a*, 130*b* (and two of the contact surfaces 132*a*, 132*b*), in other embodiments one or three or more undercuts can be formed (and a corresponding number of contact surfaces). Where more than one is provided, the undercuts 130*a*, 130*b* may be equidistantly spaced along a circumference of the connector structure 120 in some embodiments. Further, while the platform 110 and the connector structure 120 have been shown as being circular in nature, other shapes are also acceptable. For example, a shape of the connector structure 120 can be an ellipse, a polygon, a complex shape such as a combination of the aforementioned, etc.

In some embodiments, the lid 54 (and thus the first connection format 56) is a plastic injection molded component. Under these circumstances, the undercuts 130*a*, 130*b* are readily generated with conventional injection molding systems, locating the undercuts 130*a*, 130*b* along or in alignment with the tool slide path or slide direction. For example, with respect to the non-limiting example of FIG. 4A, the undercuts 130*a*, 130*b* can be located perpendicular to a parting line (identified at 150 in FIG. 4A) in the injection molding tooling in some embodiments and in alignment with the slides of the tool. Thus, the undercuts 130*a*, 130*b* (and other features associated with connection formats of the present disclosure) are highly viable with injection molding, requiring no complex or substantive changes to conventional injection molding tool formats. Other manufacturing techniques and materials are also acceptable, and the lids (and corresponding connection format) of the present disclosure are not limited to plastic injection molding.

Returning to FIG. 3, the second connection format 72 is configured to selectively mate with features of the first connection format 56. In some embodiments, the second connection format 72 is provided as part of an adaptor, such as an adaptor 180 shown in FIG. 7. In addition to the second connection format 72 (referenced generally in FIG. 7), the adaptor 180 includes a tubular member 190. Details on the various components are provided below. In general terms, a shape of the adaptor 180 defines a central axis X. The tubular member 190 can include or provide features akin to conventional spray gun reservoir connection adaptors, such as for establishing connection to an inlet port of the spray gun. A base 192 of the second connection format 72 projects from the tubular member 190 and carries or defines other portions of the second connection format 72, and promotes mounting of the adaptor 180 to the lid 54 (FIG. 3).

Figure 7:
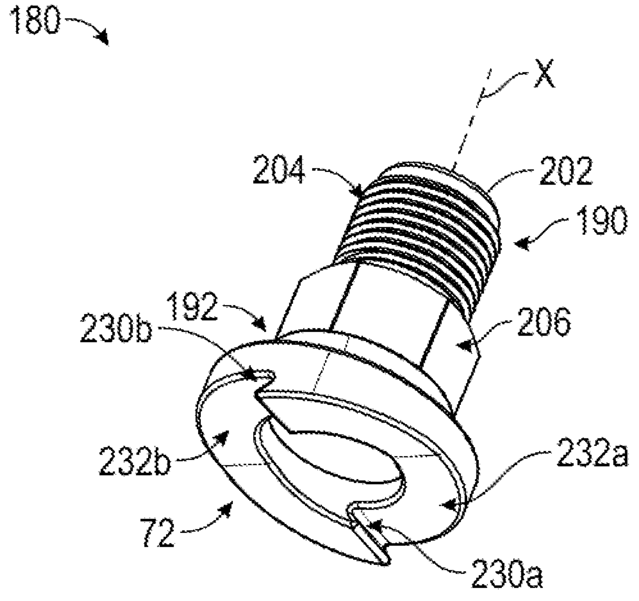
FIG. 7 is a perspective view of an adaptor useful with the connector systems of the present disclosure and including a connection format complementary with the connection format of the lid of FIG. 4A.
Figure 8A:
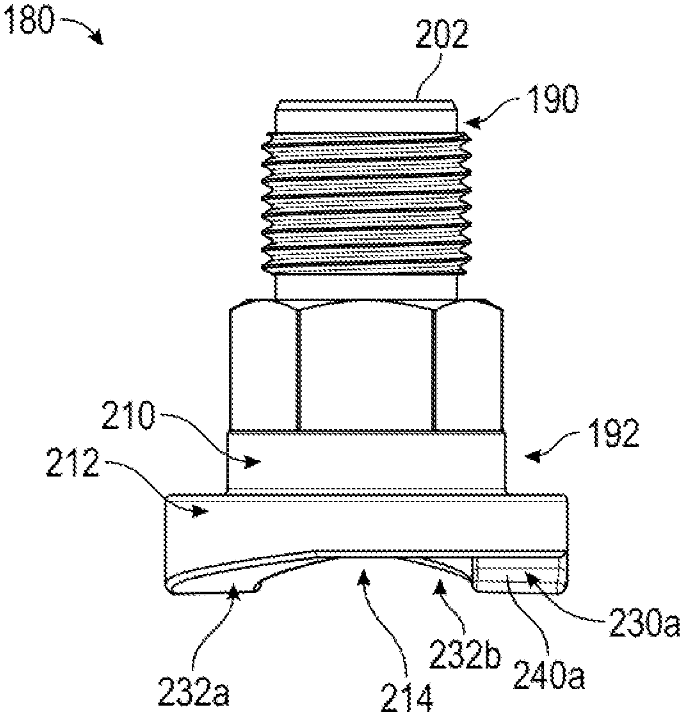
FIG. 8A is a front view of the adaptor of FIG. 7.
Figure 8B:
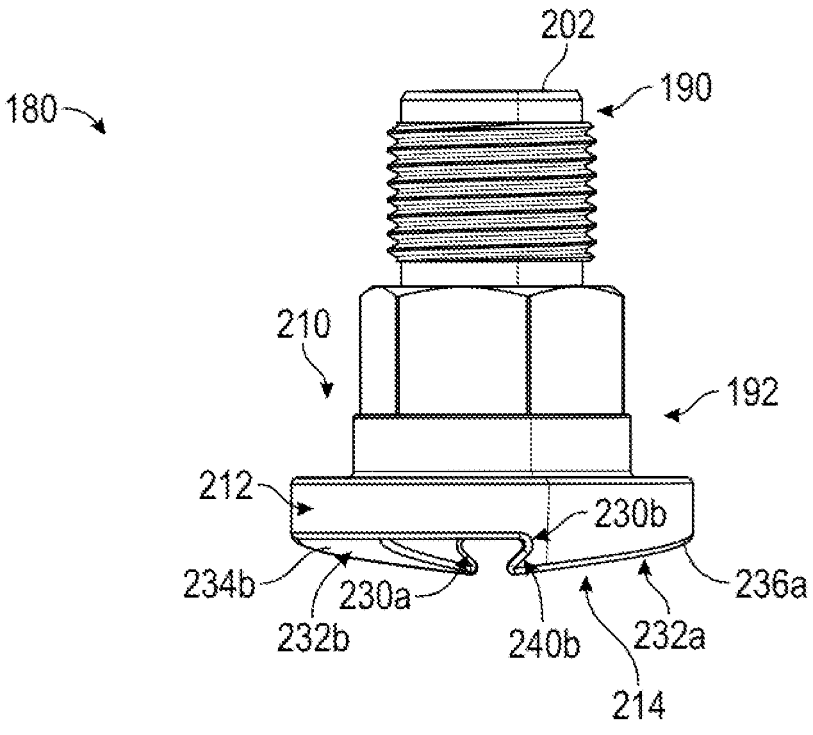
FIG. 8B is a side view of the adaptor of FIG. 7.
Figure 8C:
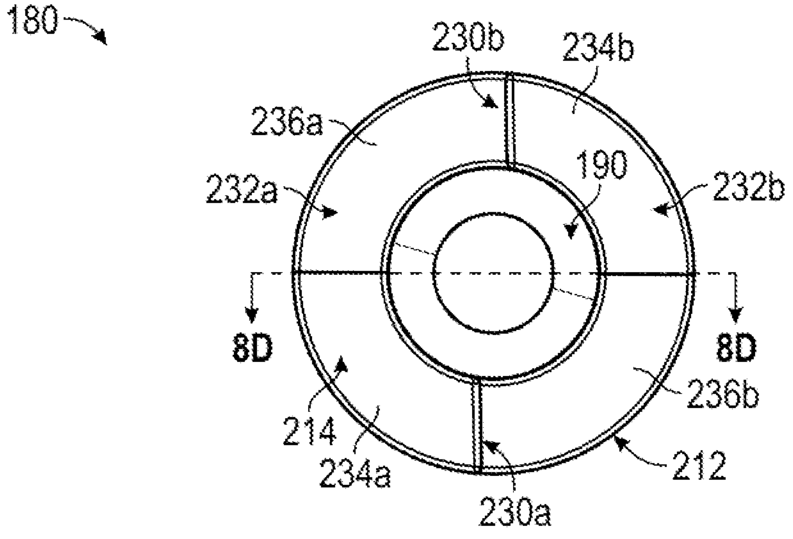
FIG. 8C is a bottom view of the adaptor of FIG. 7.
Figure 8D:
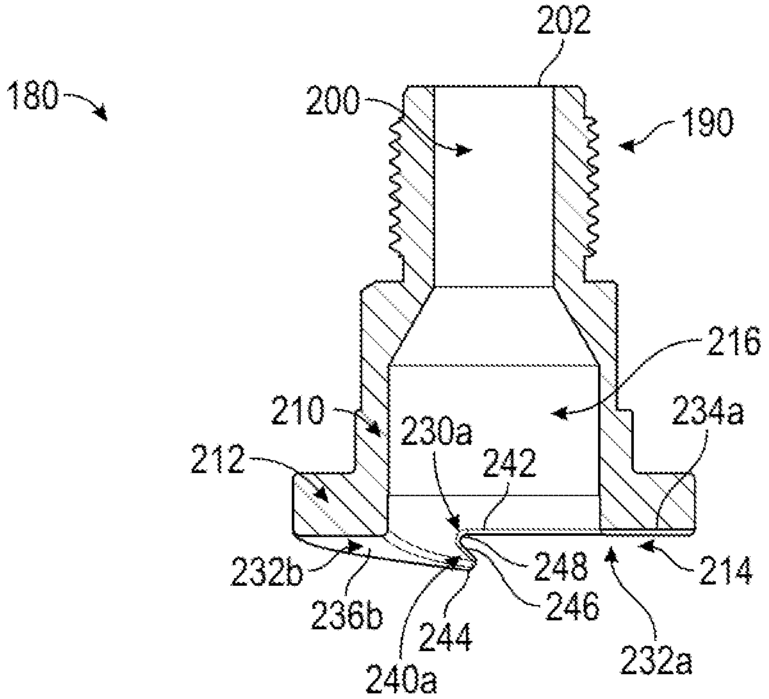
FIG. 8D is a cross-sectional view of the adaptor of FIG. 8C, taken along the line 8D-8D.

The tubular member 190 can assume various forms, and defines a central passageway 200 (hidden in FIG. 7, but shown, for example, in FIG. 8D). The passageway 200 is open at a leading end 202 of the tubular member 190. The tubular member 190 forms or provides mounting features that facilitate assembly to a conventional (e.g., threaded) spray gun inlet port. For example, exterior threads 204 can be provided along the tubular member 190 adjacent the leading end 202, configured to threadably interface with threads provided by the spray gun inlet port. In this regard, a pitch, profile and spacing of the exterior threads 204 can be selected in accordance with the specific thread pattern in the make/model of the spray gun with which the adaptor 180 is intended for use. Other spray gun mounting features are equally acceptable that may or may not include or require the exterior threads 202. The tubular member 190 can optionally further include or define a grasping section 206. The grasping section 206 is configured to facilitate user manipulation of the adaptor 180 with a conventional tool, and in some embodiments includes or defines a hexagonal surface pattern adapted to be readily engaged by a wrench. In other embodiments, the grasping section 206 can be omitted (e.g., a hexagonal or similarly-shaped surface need not be provided).

With reference to FIGS. 8A-8D, the base 192 extends from the tubular member 190 opposite the leading end 202, and includes a ring 210 and a flange 212. The flange 212 forms a connector structure 214 (referenced generally) as described below. As best shown in FIG. 8D, the ring 210 and the flange 212 combine to define a chamber 216 that is open to the central passageway 200 of the tubular member 190 and that is configured to receive the spout 100 (FIG. 4A) of the lid 54 (FIG. 4A). A diameter of the chamber 216 corresponds with an outer diameter of the spout 100 (FIG. 4A), and is selected to slidably receive the spout 100. The flange 212 projects longitudinally from an outer perimeter of the ring 210 in a direction opposite the tubular member 190 and terminates at the connector structure 214.

Geometry features of the connector structure 214 are commensurate with those described above with respect to the connector structure 120 (FIG. 4A) of the first connection format 56 (FIG. 4A). For example, one or more trapping regions or undercuts (such as first and second trapping regions or undercuts 230*a*, 230*b* illustrated in the non-limiting embodiment of FIGS. 7-8D) are formed along the connector structure 214, generating one or more contact or bearing faces (such as first and second contact or bearing faces 232*a*, 232*b* illustrated in the non-limiting embodiment of FIGS. 7-8D). The shape of the contact faces 232*a*, 232*b* (where two are provided) correspond with the first connection format contact surfaces 132*a*, 132*b* as described above, with each at least one, optionally all, of the contact faces 232*a*, 232*b* including or defining a lead-in section 234*a*, 234*b* and a ramp section 236*a*, 236*b*. The circumferential location and shape of the undercuts 230*a*, 230*b* (where two are provided) corresponds with the first connection format undercuts 130*a*, 130*b* (FIG. 5A) as described above. A shape of at least one, optionally all, of the undercuts 230*a*, 230*b* establishes a finger or retention feature 240*a*, 240*b* at the transition between the first and second contact faces 232*a*, 232*b*. For example, and as identified in FIG. 8D, the finger 240*a* defined at the first undercut 230*a* extends between a leading end 242 of the first contact face 232*a* and a trailing end 244 of the second contact face 232*b*. A major plane of the finger 240*a* is non-parallel relative to the major plane of the lead-in section 234*a* and relative to the major plane of the ramp section 236*b*, with the finger 240*a* projecting outwardly over the second contact face ramp section 236*b*. With additional reference to FIG. 6, an angular orientation of the finger 240*a* relative to the major plane of the lead-in section 234*a* corresponds with an angular orientation of the shoulder 140*a* relative to the lead-in region 134*a*. A shape of the finger 240*a* can be viewed as defining an axial retention surface 246 and a stop surface 248.

Returning to FIGS. 8A-8D, while the second connection format 72 has been described as including two of the undercuts 230*a*, 230*b* (and two of the contact faces 232*a*, 232*b*), in other embodiments one or three or more undercuts can be formed (and a corresponding number of contact faces), corresponding with the undercut construction of the first connection format 56 (FIG. 4A). Further, while the base 192 and the connector structure 214 have been shown as being circular in nature, other shapes are also acceptable, corresponding with a shape of the first connection format 56.

Figure 9:
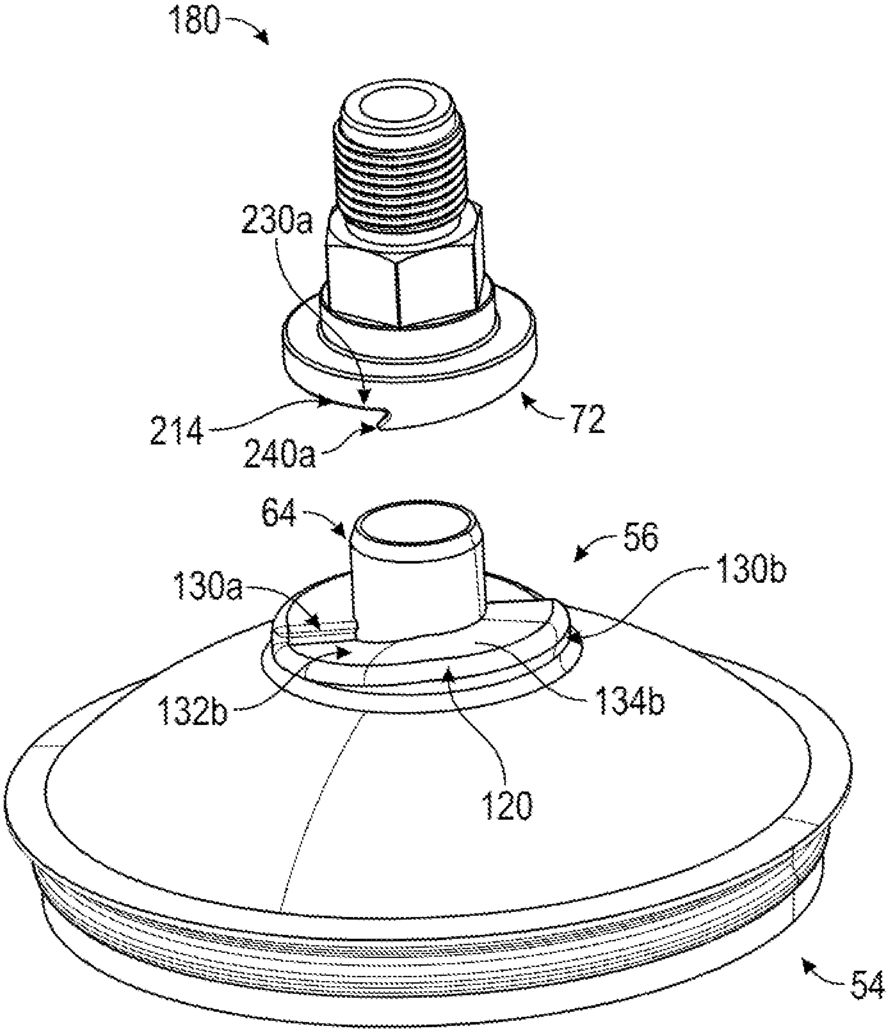
FIGS. 9-12B illustrate assembly of the connector system of FIG. 3, including coupling the lid of FIG. 4A with the adaptor of FIG. 7.

With reference to FIG. 9, engagement between the first and second connection formats 56, 72 (and thus between the lid 54 and the adaptor 180) initially entails aligning the adaptor 180 with the liquid outlet 64. The lid 54 and the adaptor 180 are spatially arranged such that the connector structure 214 of the adaptor 180 faces the connector structure 120 of the lid 54, and the adaptor undercuts 230*a*, 230*b* (one of which is visible in FIG. 9) are rotationally off-set from the lid undercuts 130*a*, 130*b* (e.g., in the arrangement of FIG. 9, the first finger 240*a* is generally aligned with the lead-in region 134*b* of the second contact surface 132*b*).

Figure 10A:
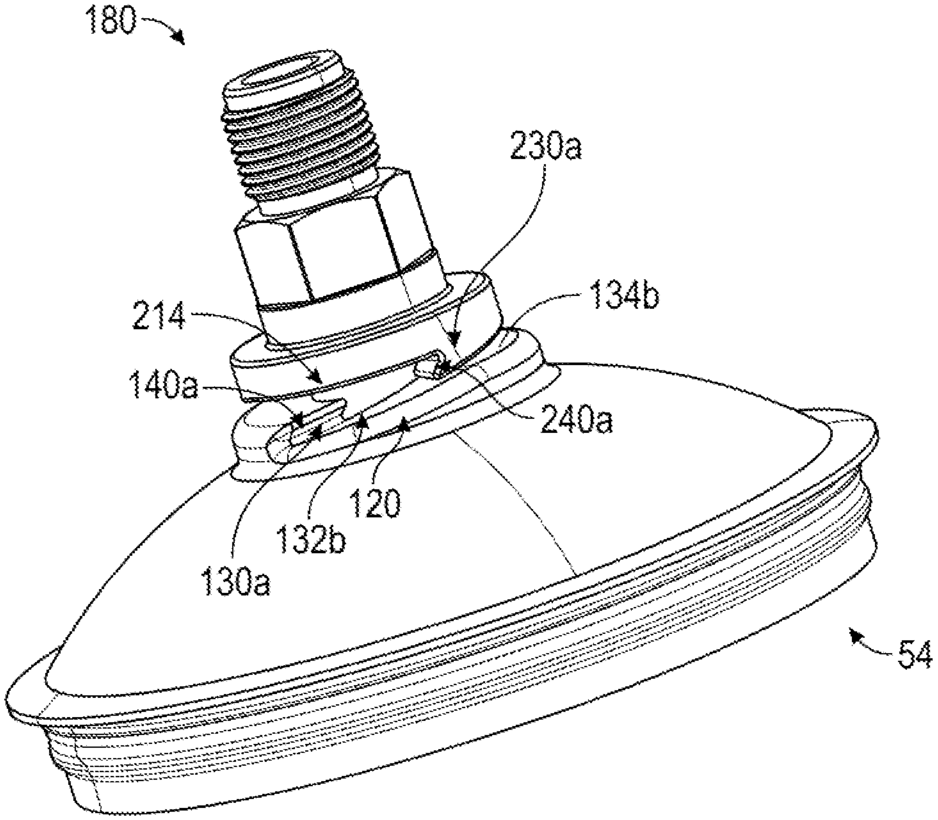
Figure 10B:
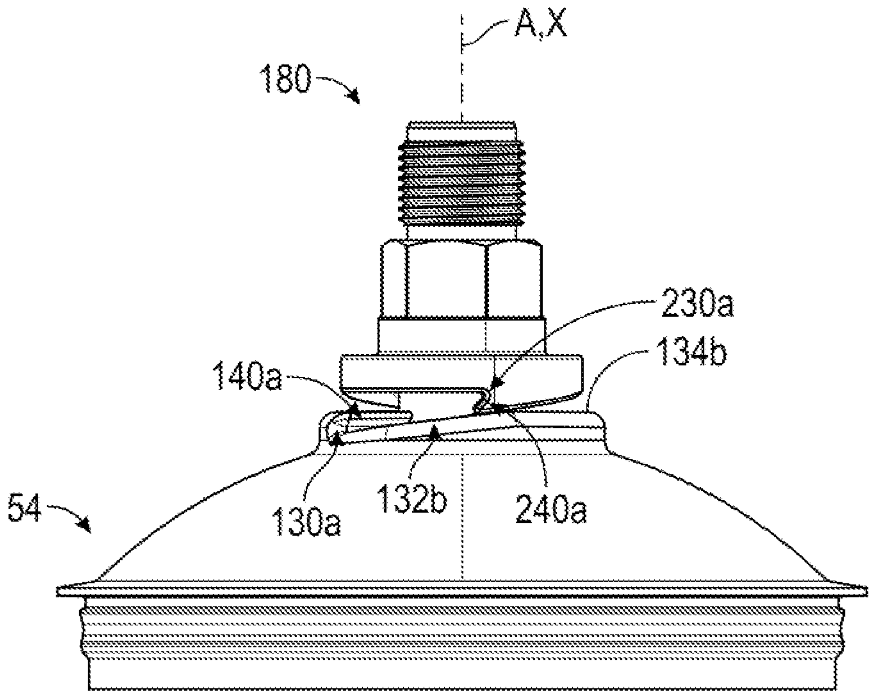
Figure 10C:
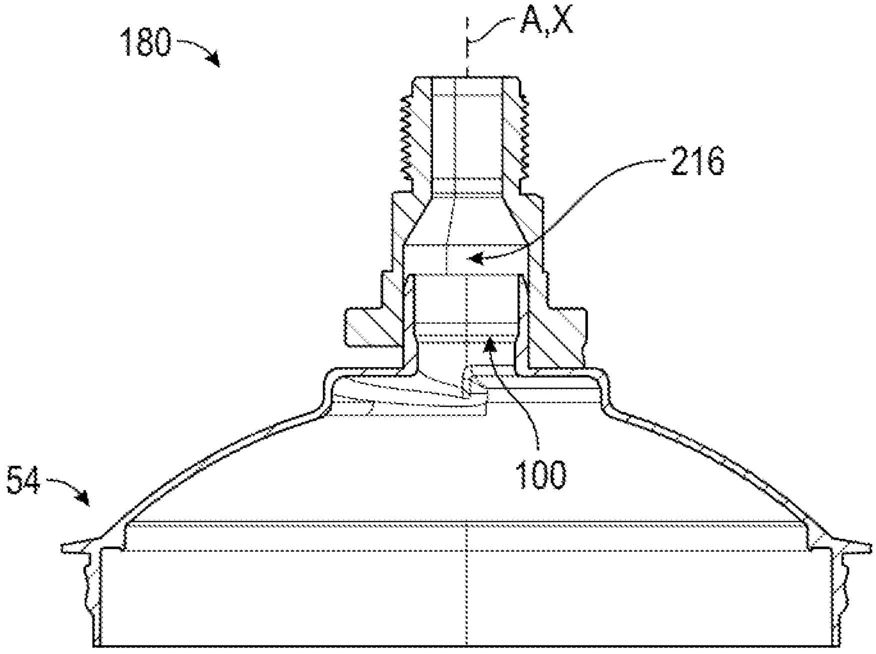

The lid 54 and the adaptor 180 are then directed toward one another, bringing the connector structure 214 of the adaptor 180 into contact with the connector structure 120 of the lid 54 as shown in FIGS. 10A-10C. The spout 100 of the lid 54 is slidably received within the chamber 216 of the adaptor 180, with the longitudinal axis A of the lid 54 being aligned with the central axis X of the adaptor 180. Due to the rotational misalignment, the adaptor connector structure 214 does not initially mesh with the lid connector structure 120. For example, FIGS. 10A and 10B illustrate that the first finger 240*a* is rotationally off-set from the first shoulder 140*a*, and bears against or is contact with the lead-in region 134*b* of the second contact surface 132*a*. Though not directly visible in the drawings, a similar relationship is established at between the second finger 240*b* and the first contact surface 132*a*. In the initial assembly state of FIGS. 10A-10C, then, the adaptor undercuts 230*a*, 230*b* and fingers 240*a*, 240*b* are vertically "above" the lid undercuts 130*a*, 130*b*.

Figure 11:
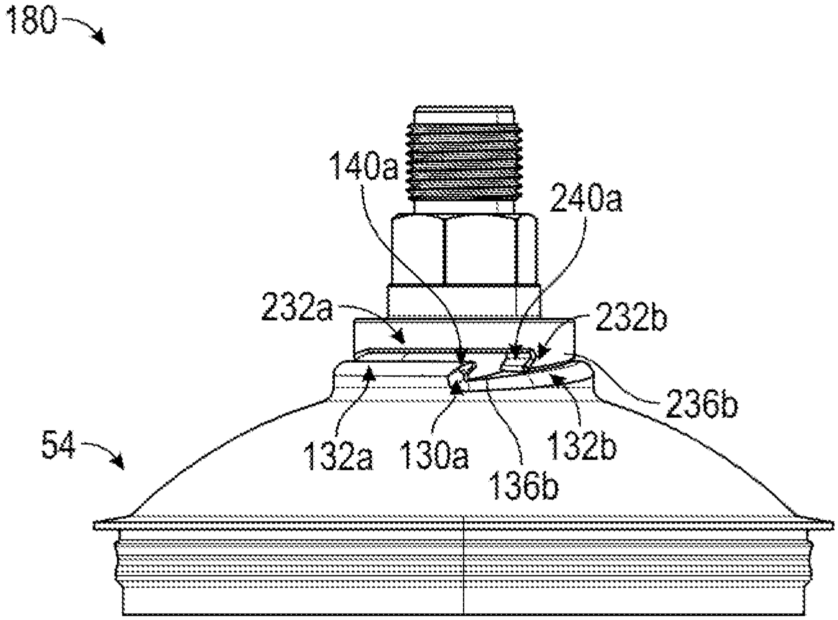

The adaptor 180 is then rotated relative to the lid 54 (and/or vice-versa) while at least a slight compression force is maintained (e.g., gravity, user-applied force, etc.), directing each of the adapter fingers 240*a*, 240*b* toward a corresponding one of the lid undercuts 130*a*, 130*b*. For example, and as identified in FIG. 11, the adaptor 180 has been rotated (e.g., clockwise) such that the finger 240*a* approaches (and later enters) the lid first undercut 130*a*. Due to the sliding interface between the ramp section 236*b* of the adaptor second contact face 232*b* and the lid ramp region 136*b* of the lid second contact surface 132*b* (and corresponding helical-like shapes), as the adaptor 180 is rotated, the adaptor 180 vertically drops or lower relative to the lid 54 such that as the finger 240*a* nears the lid undercut 130*a*, the finger 240*a* comes into alignment with the lid shoulder 140*a*.

Figure 12A:
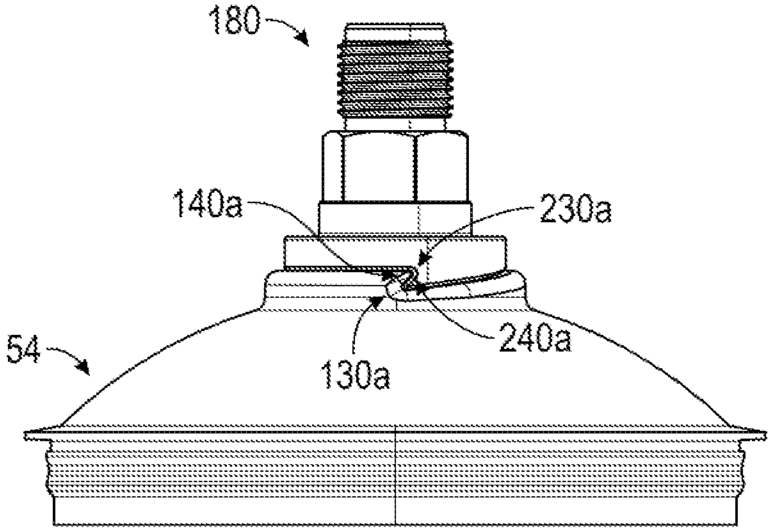
Figure 12B:
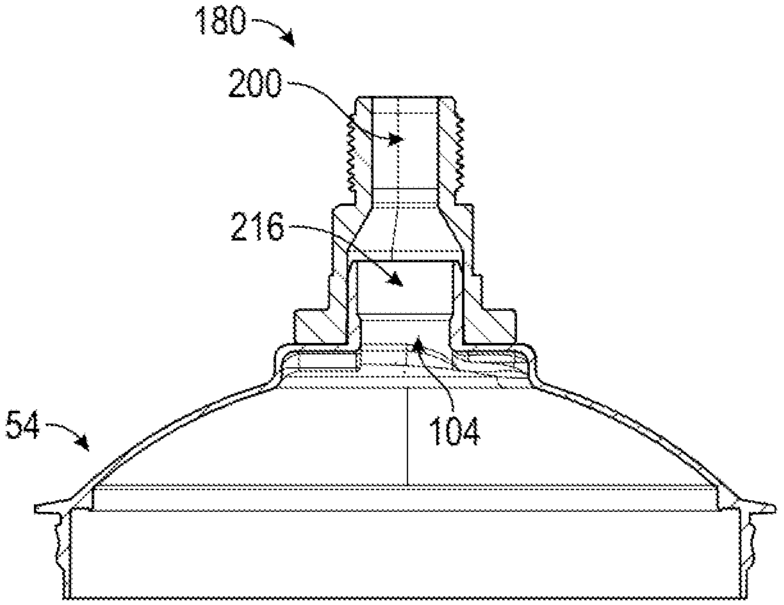

With continued rotation of the adaptor 180 relative to the lid 54 (and/or vice-versa), the lid connector structure 120 (FIG. 9) robustly engages the adaptor connector structure 214 (FIG. 9) at the corresponding undercuts 130*a*, 130*b*, 230*a*, 230*b*. FIGS. 12A and 12B illustrate the achieved locked state of the lid 54 and the adaptor 180. As shown, the adaptor first finger 240*a* is lodged within the lid first undercut 130*a*, and the lid first shoulder 140*a* is lodged within the adaptor first undercut 230*a*; the adaptor first finger 240*a* bears against the lid first shoulder 140*a*. Though not visible, a similar relationship exists at an interface between the lid second undercut 130*b* and the adaptor second undercut 230*b*. Liquid within the lid 54 readily flows through the adaptor 180 via the established fluid connection at the passage 104, the chamber 216, and the passageway 200.

In more general terms, and with additional reference to FIG. 9, as the lid 54 is rotated on to the adaptor 180 (and/or vice-versa), interface between the lid ramp region 136*a*, 136*b* and the corresponding adaptor ramp section 236*a*, 236*b* guides the lid undercut 130*a*, 130*b* into the corresponding, mating adaptor undercut 230*a*, 230*b* (and vice-versa). The downward angular orientation (in the direction of rotation) of the shoulders 140*a*, 140*b* relative to a plane perpendicular to the axis of rotation dictates that as the fingers 240*a*, 240*b* are progressively advanced along the corresponding shoulder 140*a*, 140*b*, the adaptor 180 is pulled or drawn downwardly (relative to the orientation of FIGS. 9 and 12A) on to the lid 54, promoting a liquid-tight seal between the components. The undercuts 130*a*, 130*b*, 230*a*, 230*b* act as end stops to rotational motion of the adaptor 180 relative to the lid 54 (and/or vice-versa). With additional reference to FIGS. 6 and 8D, axial retention is achieved by an interface between the axial retention surface 146 of the shoulder 140*a*, 140*b* and the axial retention surface 246 of the corresponding finger 240*a*, 240*b*; a rotational stop is effectuated by contact between the shoulder 140*a*, 140*b* and the stop surface 248 of the corresponding finger 240*a*, 240*b* and between the finger 240*a*, 240*b* and the stop surface 148 of the corresponding shoulder 140*a*, 140*b*.

Engagement between corresponding ones of the lid undercuts 130*a*, 130*b* and the adaptor undercuts 230*a*, 230*b* provides retention of the adaptor 180 to the lid 54; further, interface between the lid connector structure 120 and the adaptor connector structure 214 provides stability of the lid 54 on the adaptor 180 (and vice-versa) in an axis perpendicular to the longitudinal axis A. The ramping geometry of the connector structures 120, 214 facilitates uncoupling of the lid 54 from the adaptor 180 through axial rotation in some embodiments. In this regard, it will be recalled that in some embodiments, sealing features can be provided that promote a liquid-tight seal between the lid 54 and the adaptor 180 in the locked state. The liquid-tight seal can be difficult to break; however, as the adaptor 180 is rotated relative to the lid 54 from the locked state, the adaptor 180 is ramped up and off of the sealing feature, aiding in removing the adaptor 180 from the lid 54.

Features or configurations of the connection formats 56, 72 can alternatively be described with reference to various planes. For example, FIG. 13A reproduces the view of the lid 54 of FIG. 4A, along with an X, Y, Z coordinate designation. The Z axis or direction includes (or is parallel with) the longitudinal axis A. The X and Y axes (or directions) are orthogonal to the Z axis, and to each other. A centerline plane CP is defined in the X, Z plane and includes (or is parallel with) the longitudinal axis A. In other words, the centerline plane CP passes through the longitudinal axis A. With the one non-limiting embodiment of FIG. 13A in which two of the trapping regions or undercuts 130*a*, 130*b* are provided and equidistantly spaced, the centerline plane CP can centered between the two trapping regions 130*a*, 130*b*. This arrangement is further reflected in the top view of FIG. 13B (that is otherwise a reproduction of FIG. 5A). With continued reference to FIGS. 13A and 13B, an attachment plane AP is further defined orthogonal to the centerline plane CP (i.e., the attachment plane AP is defined in the X, Y plane). In some embodiments, the attachment plane AP includes the major plane of the lead-in region 134*a*, 134*b* of each of the bearing or contact surfaces 132*a*, 132*b*. This one location of the attachment plane AP is further evidenced in FIG. 13C (that is otherwise a reproduction of FIG. 5B) and in FIG. 13D (that is otherwise a reproduction of FIG. 5C). Finally, FIG. 13B identifies with arrows RD a receiving direction in which the adaptor 180 (FIG. 7) is rotated relative to the lid 54 when transitioning to the locked state as described above.

Figure 13A:
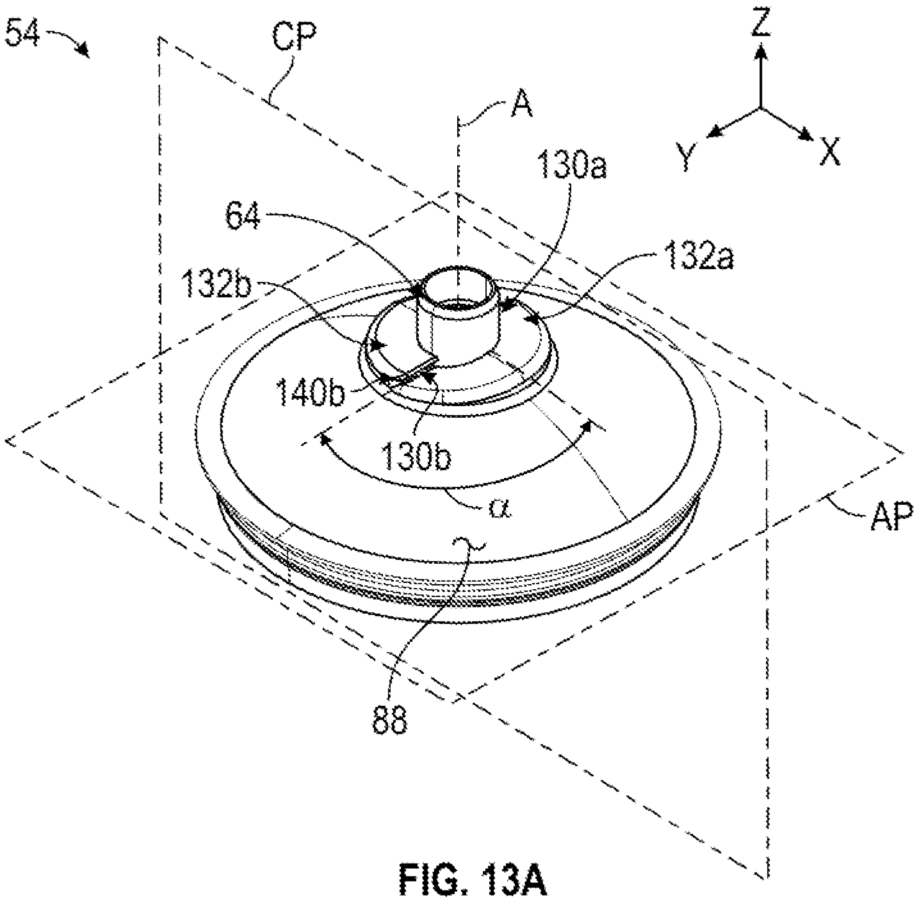
FIG. 13A is a reproduction of the perspective view of FIG. 4A along with a coordinate system and reference planes.
Figure 13B:
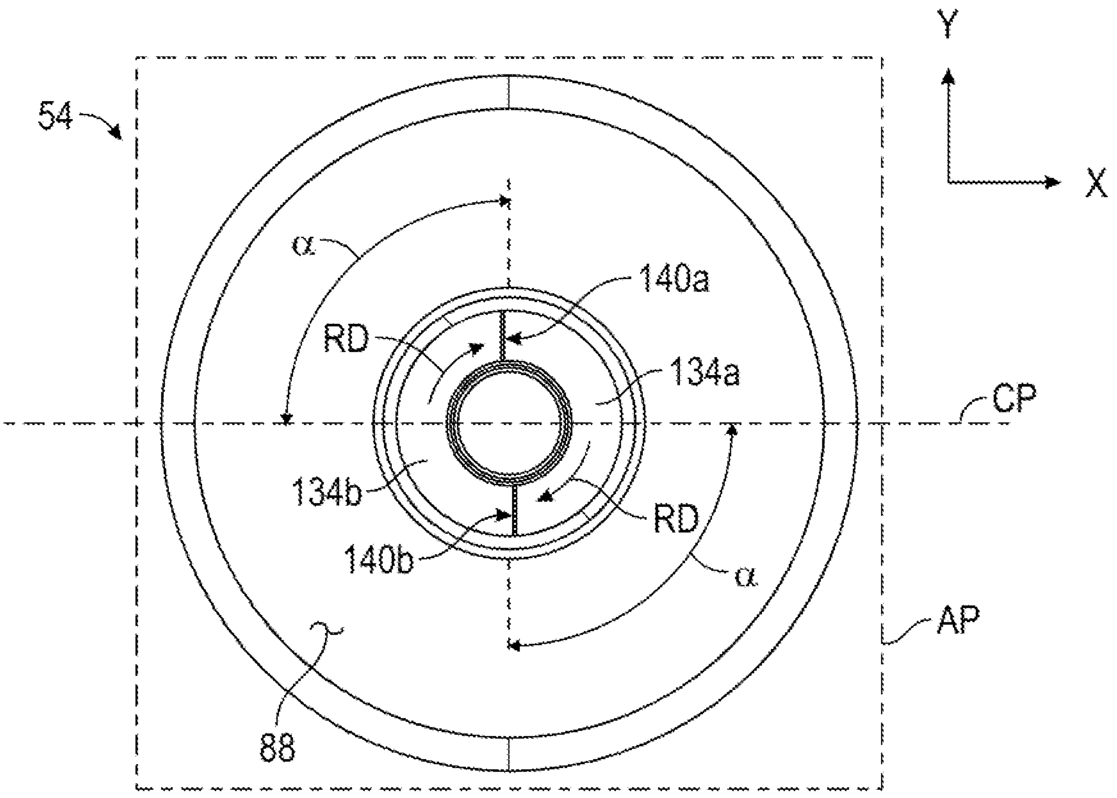
FIG. 13B is a reproduction of the top view of FIG. 5A with the coordinate system and reference planes of FIG. 13A added.
Figure 13C:
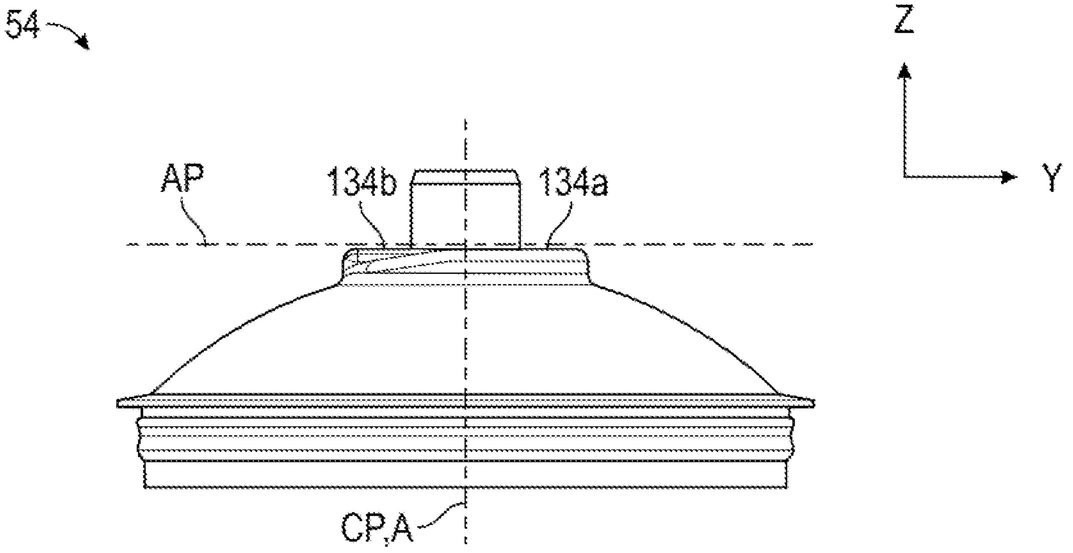
FIG. 13C is a reproduction of the front view of FIG. 5B with the coordinate system and reference planes of FIG. 13A added.
Figure 13D:
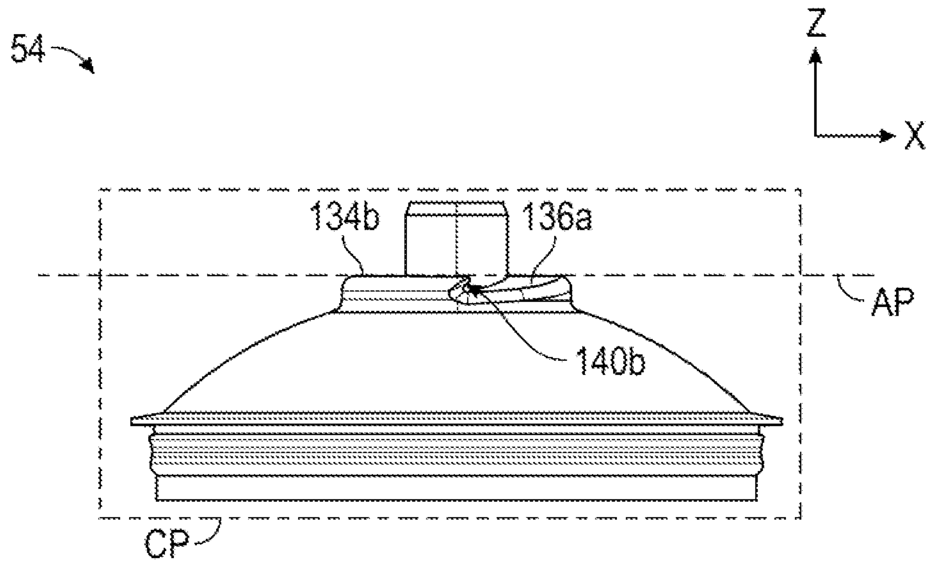
FIG. 13D is a reproduction of the side view FIG. 5C with the coordinate system and reference planes of FIG. 13A added.

With the above conventions in mind, the outer face 88 extends away from the liquid outlet 64 and in some embodiments can be viewed as comprising one or more of the retention features (e.g., the retention feature or shoulder 140*a*, 140*b* associated with the corresponding trapping region 130*a*, 130*b*) that extends away from the centerline plane CP in a direction generally parallel (i.e., within 10% of a truly parallel relationship) to the attachment plane AP. This relationship is best seen in FIGS. 13A and 13B. The retention feature(s) 140*a*, 140*b* can be considered as recessed within the outer face 88, or as protruding from the outer face 88. In other embodiments, the retention feature(s) 140*a*, 140*b* can be considered as being recessed within the lead-in region 134*a*, 134*b* of the corresponding contact surface 132*a*, 132*b* (e.g., FIG. 13E reflects the retention feature 140*a* as being recessed relative to the lead-in region 134*a* of the first contact surface 132*a*), or as protruding from the ramp region 136*a*, 136*b* of the corresponding contact surface 132*a*, 132*b* (e.g., FIG. 13E reflects the retention feature 140*a* as protruding from the ramp region 136*b* of the second contact surface 132*b*).

Figure 13E:
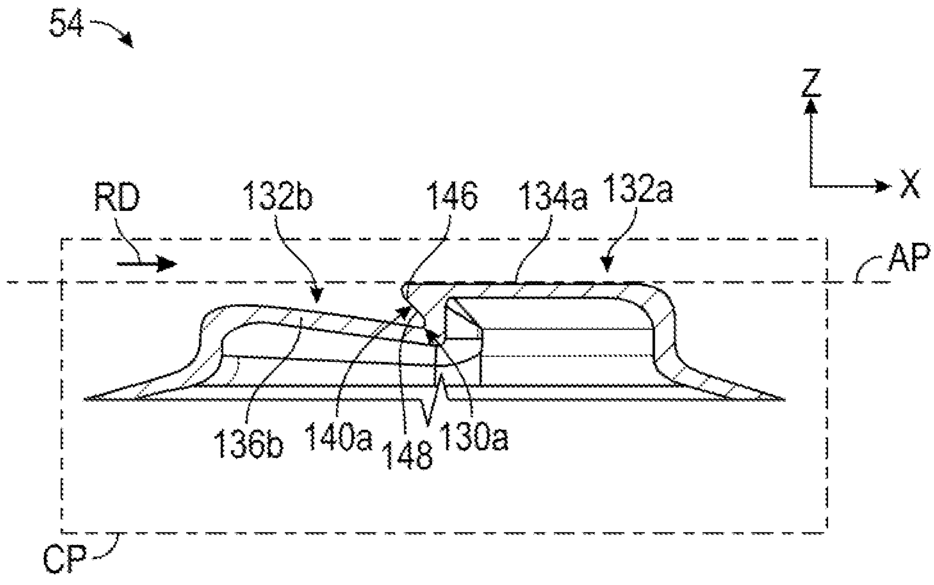
FIG. 13E is a reproduction of the cross-sectional view of FIG. 6 with the coordinate system and reference planes of FIG. 13A added.

With reference between FIGS. 13A-13E, a retention feature angle α is defined between the centerline plane CP and the stop surface 148 of the corresponding retention feature 140*a*, 140*b*. The stop surfaces 148 are primarily hidden in the views of FIGS. 13A-13D, but is identified for the retention feature 140*a* in FIG. 13E. With specific reference to FIGS. 13A and 13B, the retention feature angle α is not less than 90 degrees in some embodiments. Further, the stop surface 148 is accessible within a span of the retention feature angle α and from the receiving direction RD that is otherwise generally defined along the attachment plane AP. This relationship is further evidenced by FIG. 13E. FIG. 13E also highlights that in some embodiments, the axial retention surface 146 of the retention feature 140*a* is arranged or disposed at an acute angle relative to the attachment plane AP such that the trapping region 130*a* is formed between the axial retention surface 146 and the outer face 88 (e.g., along the second contact surface 132*b*). The above planes and angles can apply equally to the second connection format 72 (FIG. 3).

The retention feature angle α can support the optional plastic injection molding attributes of the lid 54 as described above. For example, with optional embodiments in which the lid 54 is a plastic injection molded component formed from a two-part mold, the centerline plane CP can be viewed as being defined at the parting line 150 (FIG. 4A). Thus, the retention feature angle α of not less than 90 degrees reflects that the first and second trapping regions 130*a*, 130*b* can be in alignment with the tool slide path or slide direction of the two-part mold. It is envisioned that in other embodiments, the plastic injection molding tooling can include three or more mold parts, with the retention feature angle α being not less than a corresponding dimension appropriate for promoting alignment of the trapping regions with a slide direction or tool slide path of the mold parts. For example, with a three-part mold, the retention feature angle α is not less than 60 degrees; with a four-part mold, the retention feature angle α is no less than 45 degrees; etc.

While the above descriptions have provided the complementary second connection format 72 (referenced generally in FIG. 7) as part of the adaptor 180, other configurations are also acceptable. For example, the second connection format 72 can be permanently assembled to or provided as an integral part of a spray gun (e.g., the second connection format 72 as described above can be provided as or at the inlet port 48 (FIG. 1) of the spray gun 30 (FIG. 1)).

Figure 14:
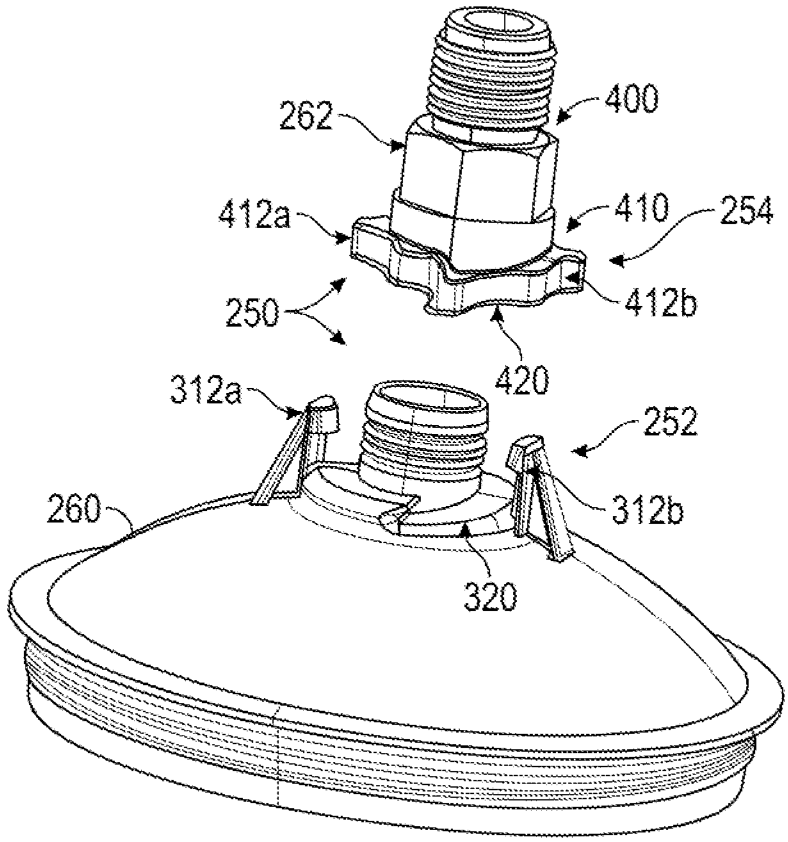
FIG. 14 is an exploded, perspective view of another spray gun reservoir connector system in accordance with principles of the present disclosure and incorporated into a reservoir lid and an adaptor.

In some embodiments, engagement between the connector structures 120, 214 in the locked state (i.e., at the undercuts 130*a*, 130*b*, 230*a*, 230*b*) can serve as or provide a primary form of retention between the lid 54 and the adaptor 180. In other embodiments in accordance with principles of the present disclosure, one or more additional connective features can be included that may or may not serve as the primary form of retention. For example, FIG. 14 illustrates portions of another spray gun reservoir connector system 250 including complementary first and second connection formats 252, 254 (referenced generally) in accordance with principles of the present disclosure. The first connection format 252 is provided as part of a lid 260; the second connection format 254 is provided as part of a spray gun liquid inlet, such as an adaptor 262 as shown adapted to connect to a spray gun.

The lid 260 is shown in greater detail in FIGS. 15A-15D and in many respects can be akin to the lid 54 (FIG. 4A) described above. The lid 260 generally includes a wall 270 and a liquid outlet 272. The liquid outlet 272 includes a spout 274 along with optional sealing features, such as a leading surface 276 of the spout 274 and/or one more annular ribs 278 formed along an exterior of the spout 274 proximate the leading surface 276.

Figure 15A:
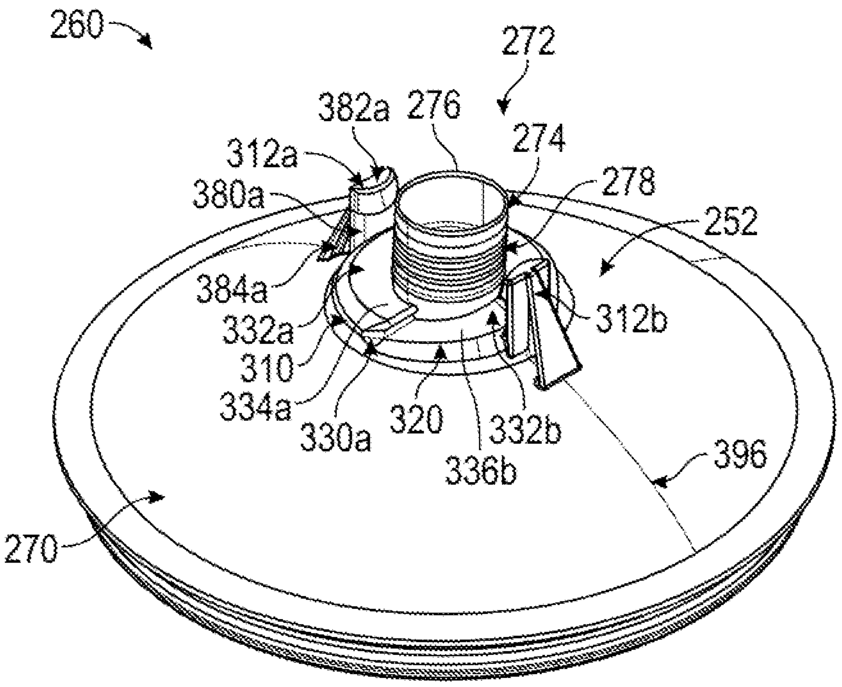
FIG. 15A is a perspective view of the lid of FIG. 14.
Figure 15B:
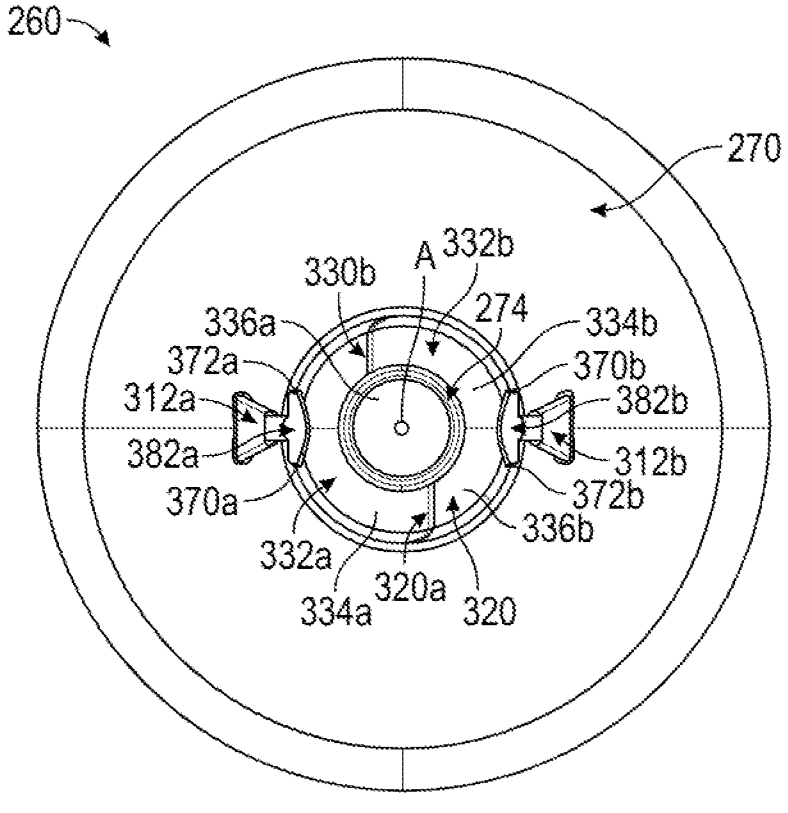
FIG. 15B is a top view of the lid of FIG. 15A.
Figure 15C:
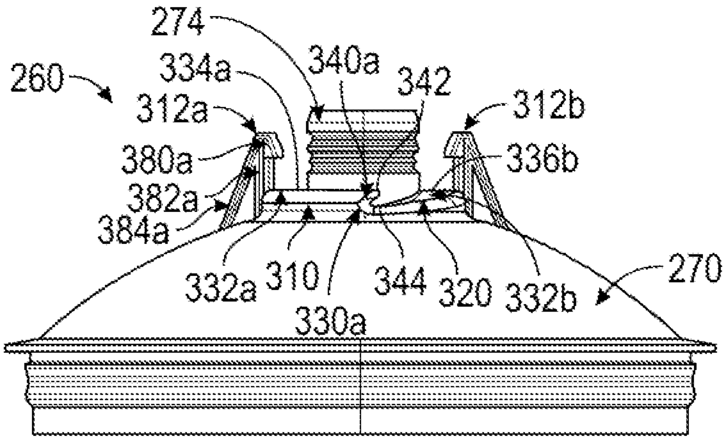
FIG. 15C is a side view of the lid of FIG. 15A.
Figure 15D:
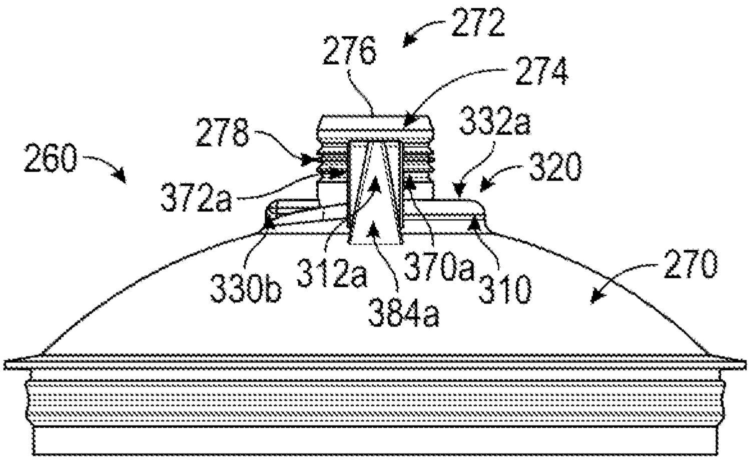
FIG. 15D is a front view of the lid of FIG. 15A.

The first connection format 252 (referenced generally in FIG. 15A) includes a platform 310 and at least one retention member (such as first and second retention members 312*a*, 312*b* illustrated in the non-limiting embodiment of FIGS. 14-15D). In general terms, the platform 310 can be highly akin to the platform 110 (FIG. 4A) described above, and terminates or forms a connector structure 320. The connector structure 320 can be akin to the connector structure 120 (FIG. 4A), providing geometry features that defines at least one trapping region or undercut (such as first and second trapping regions or undercuts 330*a*, 330*b* illustrated in the non-limiting embodiment of FIGS. 14-15D). The retention members 312*a*, 312*b* are circumferentially offset from the undercuts 330*a*, 330*b* and effectuate selective locked engagement with the second connection format 254 (FIG. 13) as described below.

Commensurate with previous explanations, the first and second undercuts 330*a*, 330*b* (where two are provided) are defined in the connector structure 320, with at least one contact or bearing surface (such as first and second contact or bearing surfaces 332*a*, 332*b* illustrated in the non-limiting embodiment of FIGS. 14-15D) being formed or defined between the undercuts 330*a*, 330*b*. Relative to a rotational direction defined by revolution of the connector structure 320 about the spout 274 (i.e., clockwise or counterclockwise), the first contact surface 332*a* extends circumferentially in the clockwise direction from the first undercut 330*a* to the second undercut 330*b* and has a geometry generating a lead-in region 334*a* and a ramp region 336*a*. Relative to the clockwise direction, then, the lead-in region 334*a* is "ahead" or "upstream" of the ramp region 336*a*. The second contact surface 332*b* (or any additional contact surfaces) can be similar to the first contact surface 332*a*; in this case, the second contact surface 332*b* extends circumferentially in the clockwise direction from the second undercut 330*b* to the first undercut 330*a*, and has a geometry generating a lead-in region 334*b* and a ramp region 336*b*.

Figure 16:
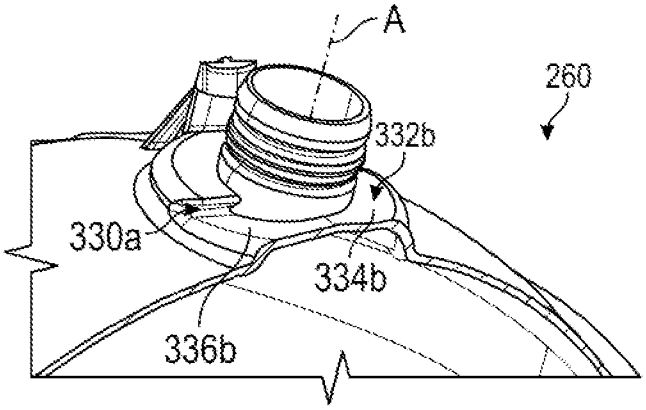
FIG. 16 is an enlarged cross-sectional view of a portion of the lid of FIG. 15A.

The contact surfaces 332*a*, 332*b* (where two are provided) can be substantially identical in some embodiments such that the following description of the second contact surface 332*b* applies equally to the first contact surface 332*a*. As best reflected by the cross-sectional view of FIG. 16, a major plane of the lead-in region 334*b* can be substantially flat (i.e., within 5% of a truly flat shape) and substantially perpendicular (i.e., within 5% of a truly perpendicular relationship) to the longitudinal axis A. The ramp region 336*b* tapers longitudinally downward (relative to the generally upright orientation of FIG. 16) in extension from the lead-in region 334*b* to the first undercut 330*a*, creating a partial helical shape. Thus, the lead-in region 334*b* is longitudinally or vertically "above" the ramp region 336*b* (relative to the generally upright orientation of FIG. 16), and a major plane of the ramp region 336*b* is oblique to the major plane of the lead-in region 334*b* (and is not substantially perpendicular to the longitudinal axis A).

Geometry features generated by the first undercut 330*a* are provided by FIG. 15C, it being understood that the second undercut 330*b* (FIG. 15B) can have a substantially identical configuration. Commensurate with the above descriptions, the first undercut 330*a* is formed at, or defines, a transition between the ramp region 336*b* of the second contact surface 332*b* and the lead-in region 334*a* of the first contact surface 332*a*. A shoulder or retention feature 340*a* is defined by the undercut 330*a*, extending between a leading end 342 of the first contact surface 332*a* and a trailing end 344 of the second contact surface 332*b*. A major plane of the shoulder 340*a* is non-parallel relative to the major plane of the lead-in region 334*a* and relative to the major plane of the ramp region 336*b*, with the shoulder 340*a* projecting outwardly above the second contact surface ramp region 336*b*. The shoulder 340*a* can define the axial retention surface and stop surface as described above.

With continued reference to FIGS. 15A-15D, while the first connection format 252 has been described as including two of the undercuts 330*a*, 330*b* (and two of the retention members 312*a*, 312*b*), in other embodiments one or three or more undercuts can be formed (and a corresponding number of retention members). Where more than one is provided, the undercuts 330*a*, 330*b* may be equidistantly spaced along a circumference of the connector structure 320 in some embodiments. Further, while the platform 310 and the connector structure 320 have been shown as being circular in nature, other shapes are also acceptable. For example, a shape of the connector structure 320 can be an ellipse, a polygon, a complex shape such as a combination of the aforementioned, etc.

Figure 17A:
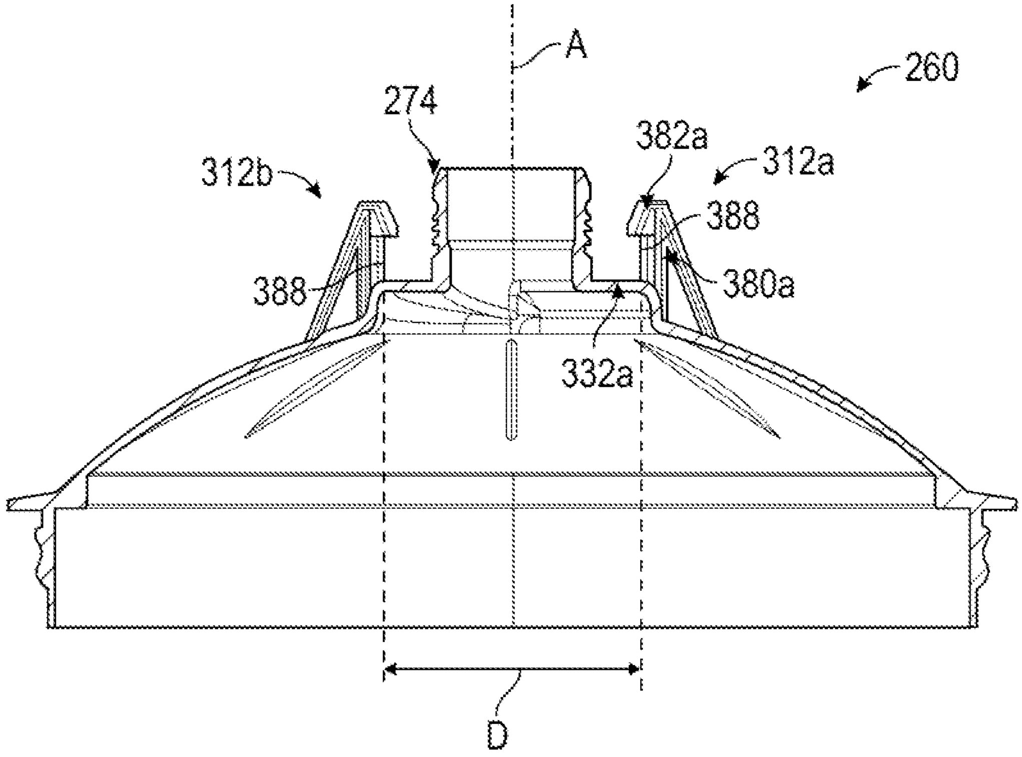
FIG. 17A is a cross-sectional view of the lid of FIG. 15A.
Figure 17B:
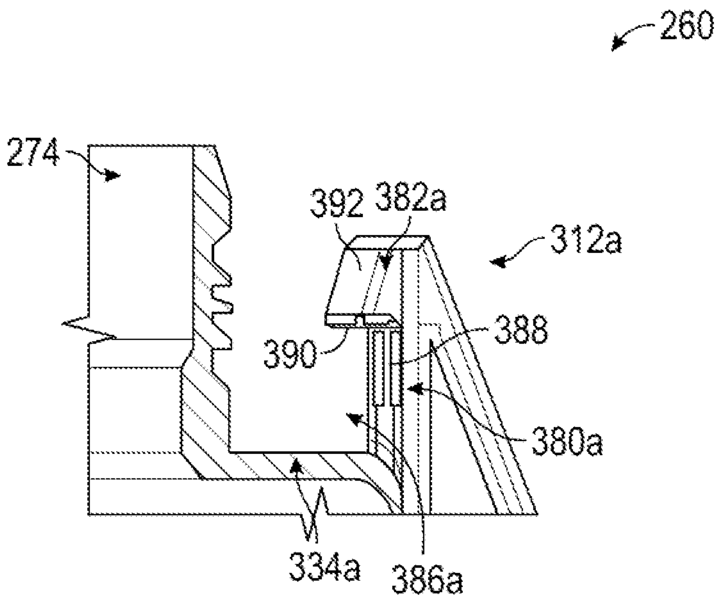
FIG. 17B is an enlarged view of a portion of the cross-sectional view of FIG. 15A.
Figure 17C:
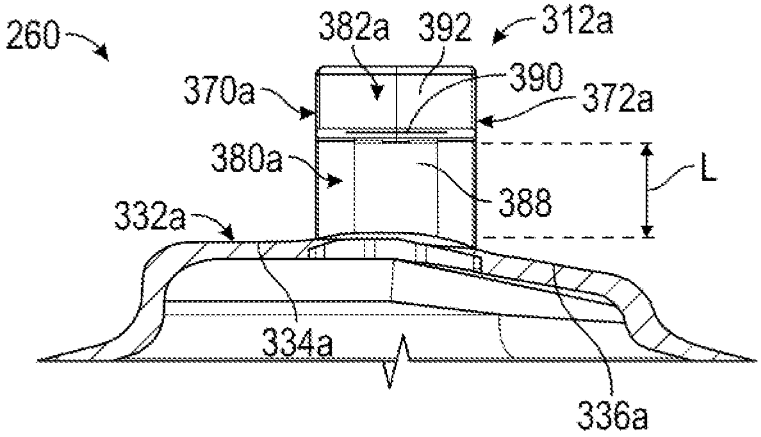
FIG. 17C is an enlarged cross-sectional view of another portion of the lid of FIG. 15A.

The retention members 312*a*, 312*b* (where two or more are provided) can be identical such that the following description of the first retention member 312*a* applies equally to the second retention member 312*b*. Relative to the rotational direction described above, the first retention member 312*a* can be viewed as defining opposing, first and second ends 370*a*, 372*a*. The retention member 312*a* includes an arm 380*a* and a tab 382*a*. The arm 380*a* is radially spaced from the spout 274, and projects upwardly from the wall 270. One or more reinforcement struts 384*a* are optionally provided between the arm 380*a* and the wall 270, serving to bias or reinforce the arm 380*a* to the upright orientation shown. The tab 382*a* projects radially inwardly from the arm 380*a* opposite the wall 270. As best seen in FIGS. 17A-17C, the first retention member 312*a* is associated with the first contact surface 332*a*, with a capture region 386*a* being defined by the contact surface 332*a*, the arm 380*a* and the tab 382*a* for receiving a corresponding feature of the second connection format 254 (FIG. 14).

More particularly, projection of the arm 380*a* defines an engagement surface 388. The engagement surface 388 faces, and is radially spaced from, the spout 274. The tab 382*a* projects radially inwardly relative to the engagement surface 388, and defines a guide surface 390 and an alignment surface 392. The guide surface 390 faces the contact surface 332*a*, and is longitudinally spaced from the contact surface 332*a* by a longitudinal spacing L. The contact surface 332*a*, the engagement surface 388 and the guide surface 390 combine to define the capture region 386*a*. The alignment surface 392 faces, and is radially spaced from, the spout 274. Dimensions of the engagement surface 388 and of the alignment surface 392 relative to the longitudinal axis A correspond with geometry features of the adaptor 262 (FIG. 14). In this regard, and with specific reference to FIG. 17A, the engagement surfaces 388 collectively define, relative to the longitudinal axis A, a capture diameter D that is selected in accordance with geometry features of the adaptor 262 to facilitate desired coupling and up-coupling operations as described below.

Figure 18:
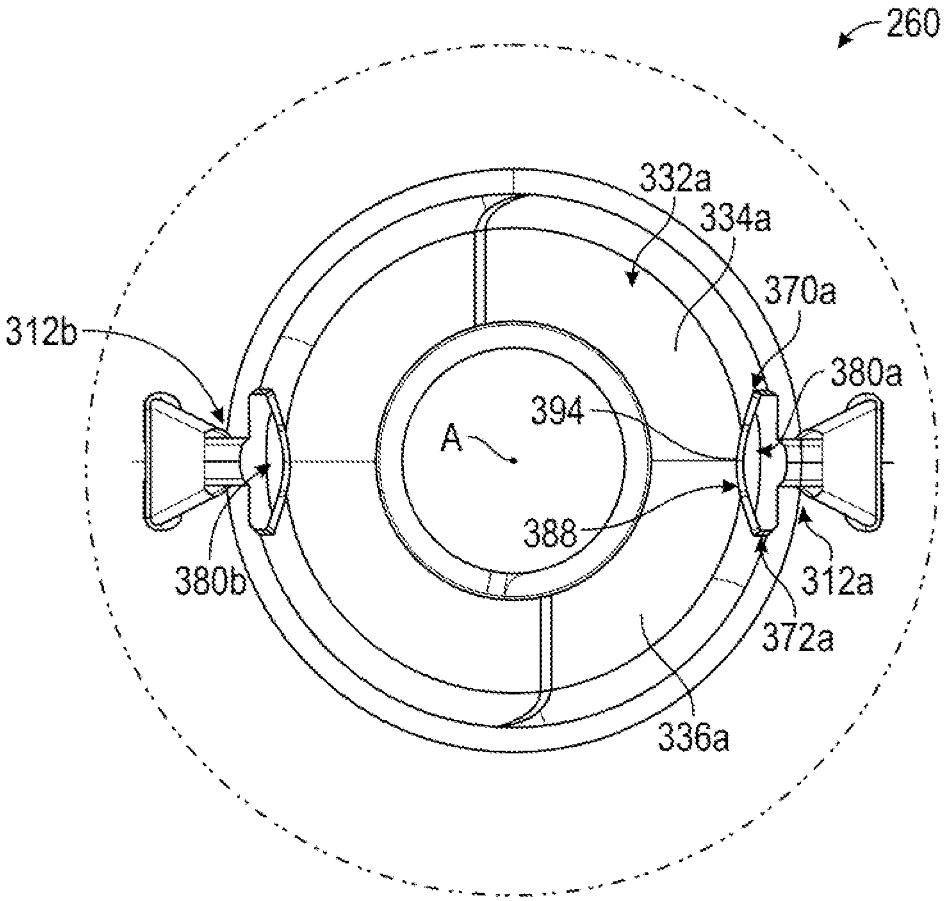
FIG. 18 is an enlarged top view of a portion of the lid of FIG. 15A.

Geometry of the contact surface 332*a* and the retention member 312*a* is configured to facilitate locked engagement with corresponding features of the second connection format 254 within the capture region 386*a*, as well as to facilitate coupling and un-coupling operations. With reference to FIG. 18 (that otherwise provides a portion of a cross-sectional plane passing through the arm 380*a*, 380*b* of the first and second retention members 312*a*, 312*b*), a position of the arm 380*a* relative to the first contact surface 332*a* is in general alignment with the point of transition from the lead-in region 334*a* and the ramp region 336*a*. In some embodiments, the engagement surface 388 defined by the arm 380*a* has a convex shape in a plane perpendicular to the longitudinal axis A (i.e., the plane of FIG. 18), incrementally projecting or tapering toward the longitudinal axis A from the first end 370*a* to an intermediate point 394. The engagement surface 388 can optionally project or taper inwardly away from the longitudinal axis A from the intermediate point 394 to the second end 372*a*. Regardless, a shape of the engagement surface 388 promotes locked interface with corresponding features of the second connection format 254 (FIG. 14) as described below.

In addition, and with reference to FIG. 17C, the tab 382*a* projects over the contact surface 332*a* at the transition between the lead-in region 334*a* and the ramp region 336*a*. Stated otherwise, the first end 370*a* of the retention member 312*a* is aligned with the lead-in region 334*a*, and the second end 372*a* is aligned with the ramp region 336*a*. Thus, at the first end 370*a*, the guide surface 390 projects over the lead-in region 334*a* and at the second end 372*a*, the guide surface 390 projects over the ramp region 336*a*. A major plane of the guide surface 390 in extension from the first end 370*a* can be substantially flat or planar (i.e., within 5% of a truly flat or planar arrangement), and can be substantially parallel (i.e., within 5% of a truly parallel relationship) with the major plane of the lead-in region 334*a*. With this construction, the longitudinal spacing L is substantially uniform along the lead-in region 334*a*. As described above, the major plane of the ramp region 336*a* is oblique with respect to the major plane of the lead-in region 334*a*, and thus is also oblique with respect to the major plane of the guide surface 390. Thus, the longitudinal spacing L increases along the ramp region 336*a*, from the lead-in region 334*a* to the second end 372*a*, and corresponds with geometry features of the second connection format 254 (FIG. 14) to promote a rotational interface as described below.

With additional reference to FIG. 15B, the contact surface 332*a*, 332*b* and the corresponding retention member 312*a*, 312*b* are arranged such that the uniform, then expanding shape of the corresponding capture region 386*a*, 386*b* is in the same rotational direction relative to the longitudinal axis A. For example, relative to the orientation of FIG. 15B, the first end 370*a* of the first retention member 312*a* is aligned with the lead-in region 334*a* of the first contact surface 332*a*, and is rotationally "ahead" of the corresponding second end 372*a* and ramp region 336*a* in the clockwise direction; similarly, the first end 370*b* of the second retention member 312*b* is aligned with the lead-in region 334*b* of the second contact surface 332*b*, and is rotationally "ahead" of the corresponding second end 372*b* and ramp region 336*b* in the clockwise direction. FIG. 15B further reflects that in some embodiments, the alignment surface 392 (not numbered in FIG. 15B) of the tab 382*a*, 382*b* of each retention member 312*a*, 312*b* can be curved (e.g., convex curvature) in a plane perpendicular to the longitudinal axis A.

While FIGS. 15A-15D illustrate the first connection format 252 as including two of the retention members 312*a*, 312*b*, in other embodiments one or three or more of the retention members are provided (commensurate with the number of the contact surfaces 332*a*, 332*b*). The retention members 312*a*, 312*b* are optionally equidistantly spaced about the spout 274 in some embodiments. Regardless, an open zone is defined between circumferentially adjacent ones of the retention members 312*a*, 312*b* for reasons made clear below.

In some embodiments, the lid 260 (and thus the first connection format 252) is a plastic injection molded component. Under these circumstances, the one or more undercuts 330*a*, 330*b* are readily generated with conventional injection molding systems, locating the one or more undercuts 330*a*, 330*b* along or in alignment with the tool slide path or slide direction, for example circumferentially off-set (e.g., 90 degrees) from a corresponding one of the retention members 312*a*, 312*b*. As a point of reference, with the non-limiting example of FIG. 15A, two of the retention members 312*a*, 312*b* are provided and are formed at a parting line (identified at 396 in FIG. 15A) in the injection molding tooling; the undercuts 330*a*, 330*b* can be 90 degrees to the parting line 396 in some embodiments and in alignment with the slides of the tool. Thus, the one or more undercuts 330*a*, 330*b* (and other features associated with connection formats of the present disclosure) are highly viable with injection molding, requiring no complex or substantive changes to conventional injection molding tool formats (that is otherwise designed for injection molding a lid including the one or more retention members 312*a*, 312*b*). Other manufacturing techniques and materials are also acceptable, and the lids (and corresponding connection format) of the present disclosure are not limited to plastic injection molding.

Returning to FIG. 14, the adaptor 262 can be akin to the adaptor 180 (FIG. 7) described above, and generally includes the second connection format 254 and a tubular member 400. The tubular member 400 can include any of the features described above with respect to the tubular member 190 (FIG. 7). The second connection format 254 includes a base 410 and one or more lock structures (such as the lock structures 412*a*, 412*b* illustrated in the non-limiting example of FIG. 14). In general terms, the base 410 forms a connector structure 420 (referenced generally) configured for complementary interface with the lid connector structure 320. The one or more lock structures 412*a*, 412*b* are configured to selectively interface with corresponding ones of the one or more retention members 312*a*, 312*b* as described below.

Figure 19A:
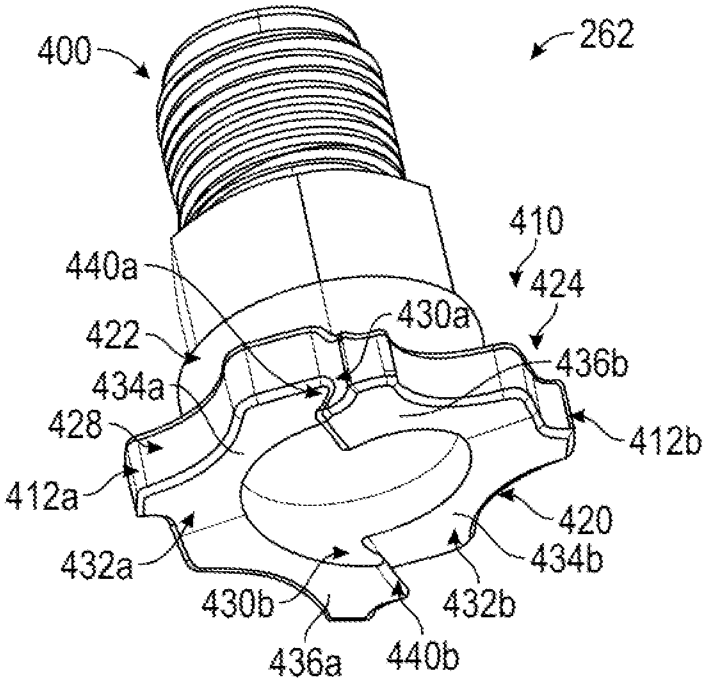
FIG. 19A is a perspective view of the adaptor of FIG. 14.
Figure 19B:
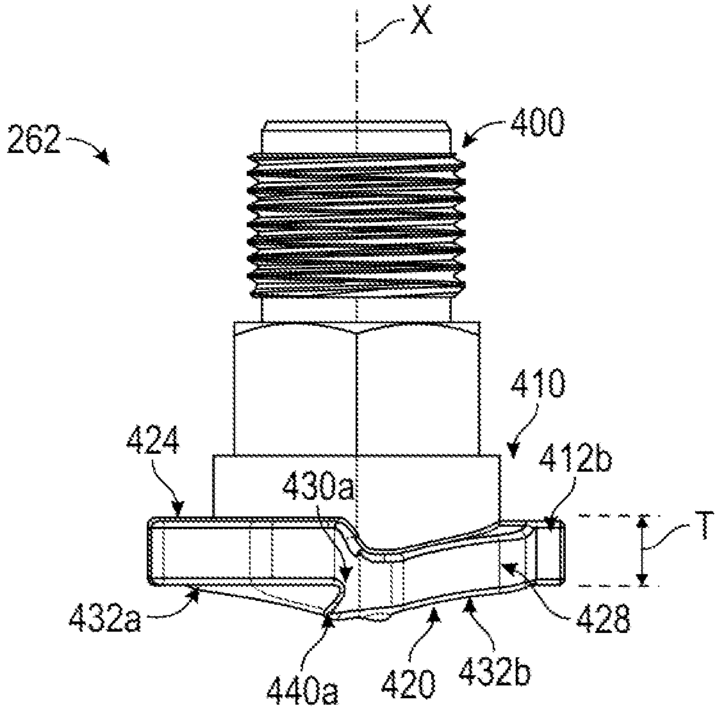
FIG. 19B is a side view of the adaptor of FIG. 19A.
Figure 19C:
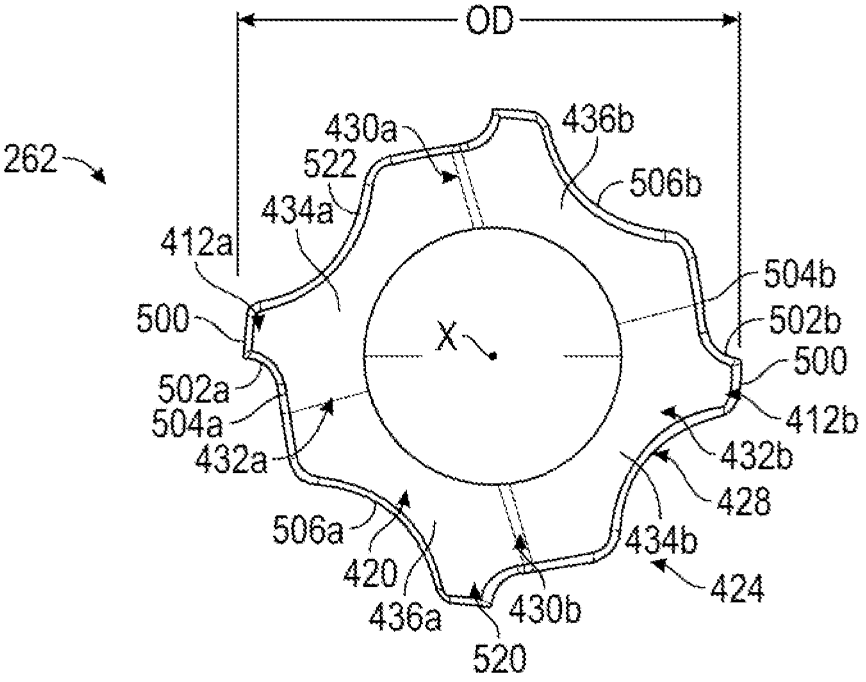
FIG. 19C is a bottom view of the adaptor of FIG. 19A.
Figure 19D:
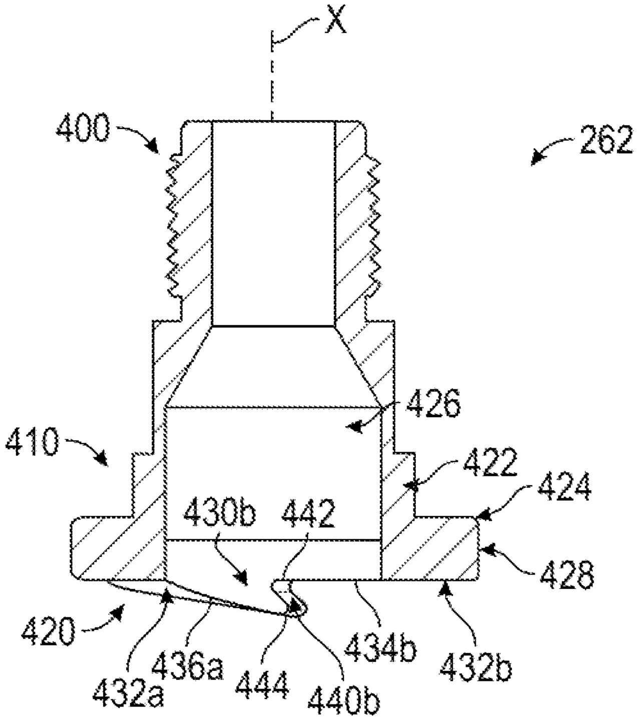
FIG. 19D is a cross-sectional view of the adaptor of FIG. 19A.

The adaptor 262 is shown in greater detail in FIGS. 19A-19D. The base 410 includes a ring 422 and a flange 424. As best shown in FIG. 19D, the ring 422 and the flange 424 combine to define a chamber 426 that is open to the passageway of the tubular member 400 and that is configured to receive the spout 274 (FIG. 15A) of the lid 260 (FIG. 14). The flange 424 projects longitudinally (relative to a central axis X of the adaptor 262) from the ring 422, and terminates at or defines the connector structure 420 opposite the tubular member 400. Further, the flange 424 extends radially from the ring 422 to define a peripheral edge 428 (referenced generally). The peripheral edge 428 can have a complex shape (best reflected by the bottom view of FIG. 19C) that generates the one or more lock structures 412*a*, 412*b* as described in greater detail below.

Geometry features of the connector structure 420 are commensurate with those described above with respect to the connector structure 320 (FIG. 14) of the first connection format 252 (FIG. 14). For example, at least one trapping region or undercut (such as the first and second trapping regions or undercuts 430*a*, 430*b* illustrated in the non-limiting example of FIGS. 19A-19D) are formed along the connector structure 420, with at least one contact or bearing face (such as the first and second contact or bearing faces 432*a*, 432*b* illustrated in the non-limiting example of FIGS. 19A-19D) being formed or defined between the undercuts 430*a*, 430*b*. The shape of the one or more contact faces 432*a*, 432*b* corresponds with the one or more first connection format contact surfaces 332*a*, 332*b* as described above, with at least one of the contact faces 432*a*, 432*b* including or defining a lead-in section 434*a*, 434*b* and a ramp section 436*a*, 436*b*. The circumferential location and shape of the undercuts 430*a*, 430*b* (where two are provided) corresponds with the first connection format undercuts 330*a*, 330*b* (FIG. 15A) as described above. A shape of at least one, optionally all, of the undercuts 430*a*, 430*b* establishes a finger or retention feature 440*a*, 440*b* at the transition between the first and second contact faces 432*a*, 432*b*. For example, and as identified in FIG. 19D, the finger 440*b* defined at the second undercut 430*b* extends between a leading end 442 of the second contact face 432*b* and a trailing end 444 of the first contact face 432*a*. A major plane of the finger 440*b* is non-parallel relative to the major plane of the lead-in section 434*b* and relative to the major plane of the ramp section 436*a*, with the finger 440*b* projecting outwardly over the first contact face lead-in section 434*a*. With additional reference to FIG. 16, an angular orientation of the finger 440*b* relative to the major plane of the ramp section 436*a* corresponds with an angular orientation of the shoulder 340*a* relative to the ramp region 336*b*. The finger 440*b* can define the axial retention surface and stop surface as described above.

Returning to FIGS. 19A-19D, while the second connection format 254 has been described as including two of the undercuts 430*a*, 430*b* (and two of the contact faces 432*a*, 432*b*), in other embodiments one or three or more undercuts can be formed (and a corresponding number of contact faces), corresponding with the undercut construction of the first connection format 252 (FIG. 14). Further, while the base 410 and the connector structure 420 have been shown as being circular in nature, other shapes are also acceptable, corresponding with a shape of the first connection format 252.

With specific reference to FIG. 19C and as mentioned above, a shape or geometry of the peripheral edge 428 of the flange 424 generates the one or more lock structures 412*a*, 412*b* as well as other features promoting coupling and un-coupling of the lock structures 412*a*, 412*b* with a corresponding one of the lid retention members 312*a*, 312*b* (FIG. 14). The lock structures 412*a*, 412*b* can be identical in some embodiments, such that the following description of the first lock structure 412*a* applies equally to the second lock structure 412*b*. The first lock structure 412*a* represents a radially outward projection (relative to the central axis X) of the flange 424. Relative to a circumferential or rotational direction defined by a shape of the flange 424 about the central axis X, the first lock structure 412*a* is 90 degrees off-set from the first and second undercuts 430*a*, 430*b*. The first lock structure 412*a* terminates at an abutment face 500 that otherwise defines a maximum radius (relative to the central axis X) of the peripheral edge 428. The abutment faces 500 combine to define a maximum outer diameter OD of the flange 424.

To facilitate insertion of the abutment face 500 into engagement with one of the retention members 312*a*, 312*b* with rotation of the adaptor 262 relative to the lid 260 (FIG. 14) and/or vice-versa, additional geometry features can be incorporated into the peripheral edge 428 "upstream" of the first lock structure 412*a* (and the second locking structure 412*b*) in the counterclockwise direction (relative to the bottom view of FIG. 19C). For example, a leading side 502*a* of the first lock structure 412*a* tapers radially inwardly from the abutment face 500. A flat 504*a* extends from the leading side 502*a* opposite the abutment face 500 in the counterclockwise direction. An insertion recess 506*a* is formed as a concave curvature in the peripheral edge 428 "ahead" (relative to the counterclockwise direction of FIG. 19C) of the flat 504*a*, and is sized and shaped to slidably receive the tab 382*a*, 382*b* (FIG. 15A) of one of the retention members 312*a*, 312*b*. As a point of clarification, in that FIG. 19C is a bottom view of the adaptor 262, the rotational designations in the above descriptions are reversed when considering the adaptor 262 from a top view (e.g., relative to a top view of the adaptor 262 (that would otherwise coincide with previous descriptions of the lid 260), the insertion recess 506*a* and the flat 504*a* are "ahead" of the lock structure 412*a* in the clockwise direction). A leading side 502*b*, a flat 504*b*, and an insertion recess 506*b* are similarly associated with the second lock structure 412*b*. The flange 424 can optionally include one or more additional geometry features along the peripheral edge 428 (e.g., secondary projections 520 and secondary recesses 522 are depicted in FIG. 19C but can be omitted in other embodiments). Finally, and as identified in FIG. 19B, a thickness (or height) T of the flange 424 at least at the lock structures 412*a*, 412*b* is slightly less than the longitudinal spacing L (FIG. 17C) of each of the retention members 312*a*, 312*b* along the corresponding lead-in region 334*a*, 334*b* (FIG. 17C) for reasons made clear below.

Figure 20:
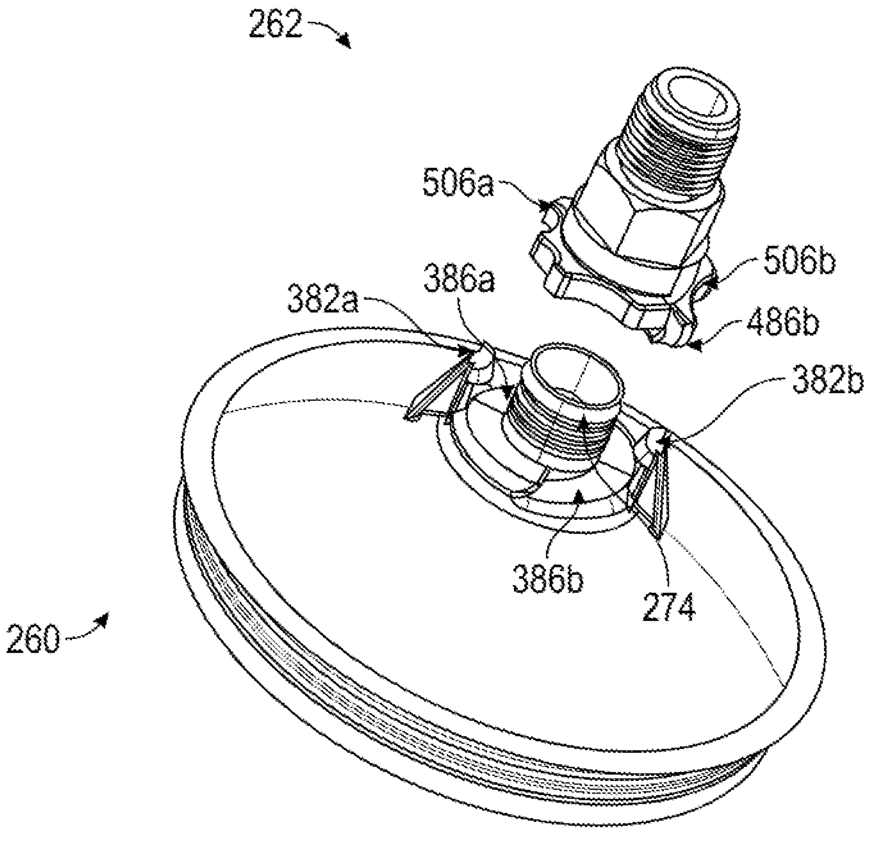
FIGS. 20-23B illustrate coupling the lid of FIG. 15A with the adaptor of FIG. 19A.

With reference to FIG. 20, coupling of the lid 260 and the adaptor 262 is commensurate with previous explanations. First, the adaptor 262 is aligned with the spout 274. In this regard, and as reflected by FIG. 20, the lid 260 and the adaptor 262 are rotationally arranged relative to one another such that each of the insertion recesses 506*a*, 506*b* is aligned with a corresponding one of the retention member tabs 382*a*, 382*b*.

Figure 21A:
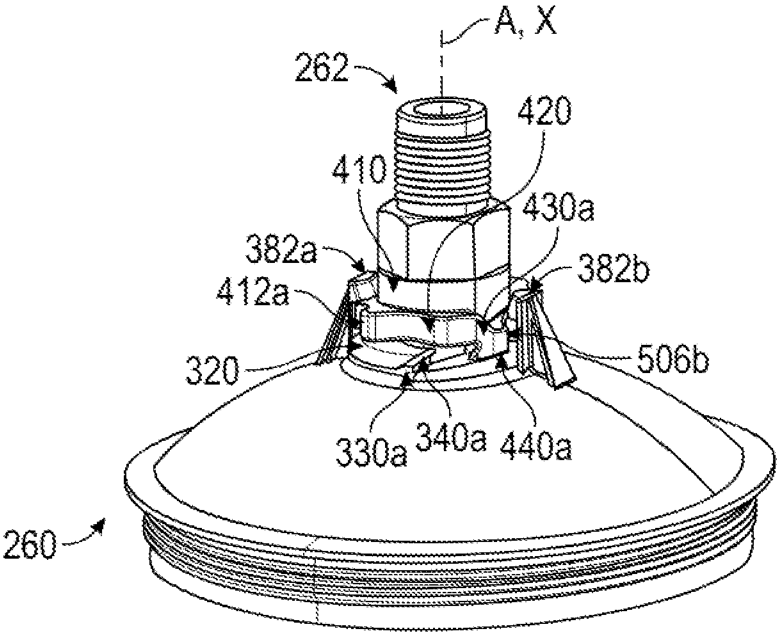
Figure 21B:
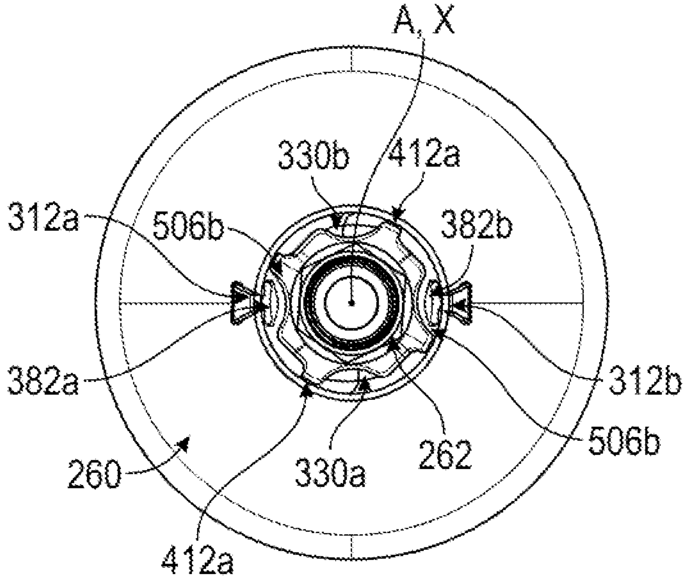

The lid 260 and the adaptor 262 are then directed toward one another, with the retention member tabs 382*a*, 382*b* being slidably received within a corresponding one of the insertion recesses 506*a*, 506*b* as reflected by FIGS. 21A and 21B. This initial insertion operation brings the connector structure 420 of the adaptor 262 into contact with the connector structure 320 of the lid 260. The spout 274 (hidden FIGS. 21A and 21B) is nested within the base 410 of the adaptor 262, with the longitudinal axis A of the lid 260 being aligned with the central axis X of the adaptor 262. Due to the rotational arrangement dictated by placement of the retention member tabs 382*a*, 382*b* within the insertion recesses 506*a*, 506*b*, the adaptor connector structure 420 does not initially mesh with the lid connector structure 320. For example, FIG. 21A illustrates that the first finger 440*a* is rotationally off-set from the first shoulder 340*a*, and bears against or is contact with the ramp region 336*a* of the first contact surface 332*a*. Though not directly visible in the drawings, a similar relationship is established at between the second finger 440*b* and the second contact surface 332*b*. Stated otherwise, in the initial assembly state of FIGS. 21A and 21B, the adaptor undercuts 430*a*, 430*b* (one of which is visible in FIG. 21A) and fingers 440*a*, 440*b* are vertically "above" the lid undercuts 330*a*, 330*b*.

Figure 22A:
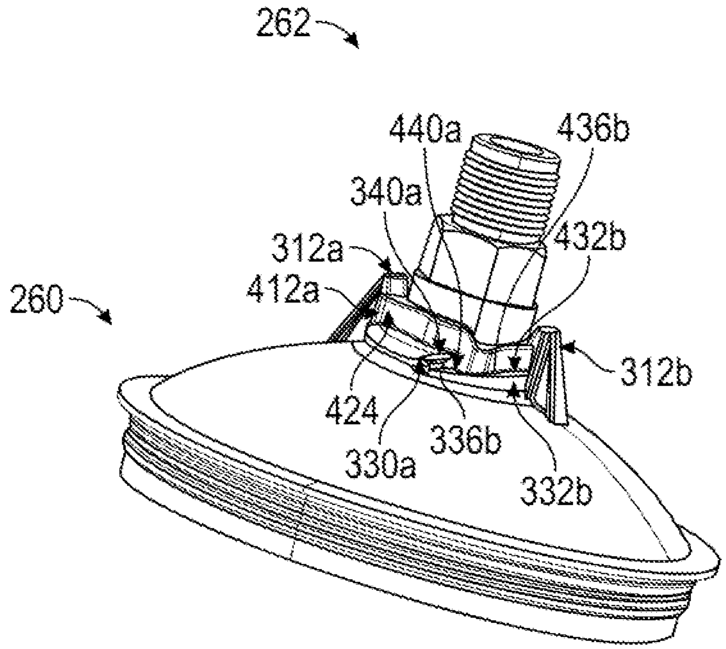

The adaptor 262 is then rotated relative to the lid 260 (and/or vice-versa) with at least a slight compression force being maintained (e.g., gravity, user-applied force, etc.), directing each of the lock structures 412*a*, 412*b* toward a corresponding one of the retention members 312*a*, 312*b*, and each of the adaptor fingers 440*a*, 440*b* (one of which is visible in FIG. 22A) toward a corresponding one of the lid undercuts 330*a*, 330*b*. For example, and with reference to the second contact surface 332*b* and the second contact face 432*b* identified in FIG. 22A, the adaptor 262 has been rotated (clockwise) from the initial assembly state of FIGS. 21A and 21B such that the finger 440*a* is approaching (and will later enter) the lid first undercut 330*a*. Due to the sliding interface between the adaptor ramp section 436*b* and the lid ramp region 336*b* (and corresponding helical-like shapes), as the adaptor 262 is rotated, the adaptor 262 vertically drops or lower relative to the lid 269 such that as the finger 440*a* nears the lid first undercut 330*a*, the finger 440*a* comes into alignment with the lid shoulder 340*a*. Interface between the flange 424 and the retention member tabs 382*a*, 382*b*, and in particular with the corresponding guide surface 390 (FIG. 17C), ensures that the adaptor ramp sections 436*a*, 436*b* track along the corresponding lid ramp regions 336*a*, 336*b* with rotation of the lid 260 and the adaptor 262 relative to each other. Rotation of the components 260, 262 relative to each other also directs the leading side 502*a* of the first lock structure 412*a* toward the first end 370*a* of the first retention member 312*a*, and the leading side 502*b* of the second lock structure 412*b* toward the first end 370*b* of the second retention member 312*b*.

Figure 22B:
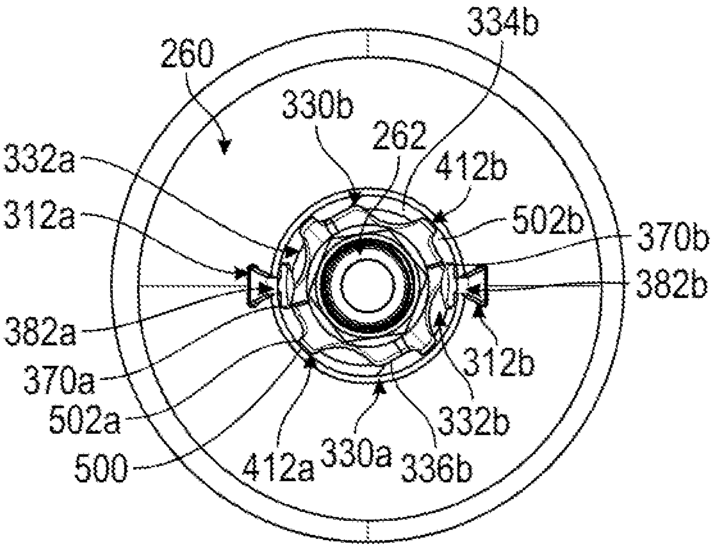
Figure 23A:
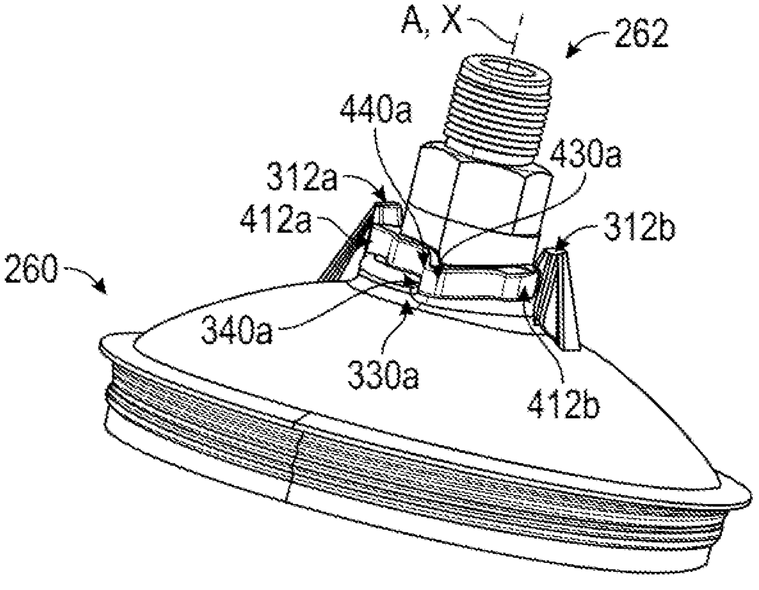
Figure 23B:
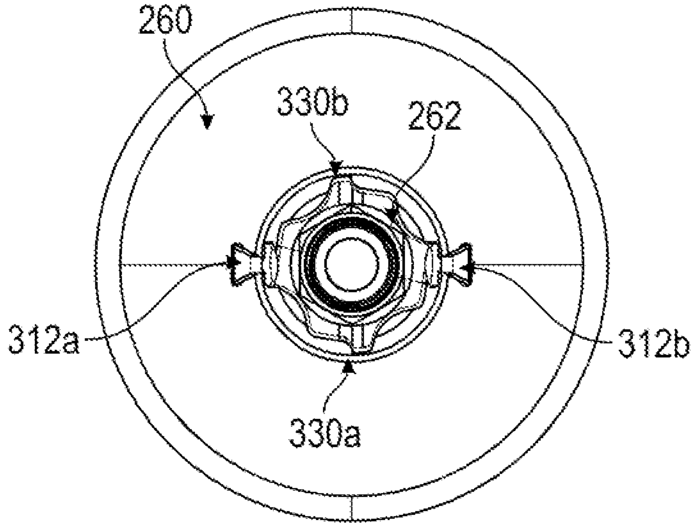

With continued rotation of the adaptor 262 relative to the lid 260 (and/or vice-versa), each of the lock structures 412*a*, 412*b* enters the capture region 386*a*, 386*b* (hidden in FIGS. 22A and 22B, but shown, for example, in FIG. 17B) of the corresponding retention member 312*a*, 312*b*, with the abutment face 500 of each of the lock structures 412*a*, 412*b* becoming frictionally and mechanically locked against the engagement face 388 (FIG. 17C) of the corresponding retention member 312*a*, 312*b*. For example, FIGS. 23A and 23B generally illustrate a locked state of the lid 260 and the adaptor 262. As a point of reference, the maximum outer diameter OD (FIG. 19C) collectively defined by the lock structures 412*a*, 412*b* is greater than the capture diameter D (FIG. 16C) collectively defined by the retention members 312*a*, 312*b*; thus, as the lock structures 412*a*, 412*b* are directed into engagement with the corresponding retention member 312*a*, 312*b*, the retention members 312*a*, 312*b* are forced to deflect slightly radially outwardly to securely retain the lock structures 412*a*, 412*b*. Moreover, and as best understood with cross-reference between FIGS. 17C and 19B, the thickness T of the lock structures 412*a*, 412*b* is slightly less than the longitudinal spacing L of the retention members 312*a*, 312*b* such that each lock structure 412*a*, 412*b* readily enters the corresponding retention member capture region 386*a*, 386*b* with rotation of the lid 260 and the adaptor 262 relative to one another. Further, and returning to FIGS. 22A and 22B, the lid connector structure 320 (FIG. 14) engages the adaptor connector structure 420 (FIG. 14) at the corresponding undercuts 330*a*, 330*b*, 430*a*, 430*b* (it being understood that the undercuts 330*a*, 330*b*, 430*a*, 430*b* are primarily hidden in FIGS. 23A and 23B). For example, the adaptor first finger 440*a* is lodged within the lid first undercut 330*a*, and the lid first shoulder 340*a* is lodged within the adaptor first undercut 430*a*; the adaptor first finger 440*a* bears against the lid first shoulder 340*a*. Though not visible, a similar relationship exists at an interface between the lid second undercut 330*b* and the adaptor second undercut 430*b*.

In more general terms, and with additional reference to FIG. 20, as the lid 260 is rotated on to the adaptor 262 (and/or vice-versa), interface between the lid ramp region 336*a*, 336*b* and the corresponding adaptor ramp section 436*a*, 436*b* guides the lid undercut 330*a*, 330*b* into the corresponding, mating adaptor undercut 430*a*, 430*b* (and vice-versa). The downward angular orientation (in the direction of rotation) of the shoulders 340*a*, 340*b* relative to a plane perpendicular to the axis of rotation dictates that as the fingers 440*a*, 440*b* are progressively advanced along the corresponding shoulder 340*a*, 340*b*, the adaptor 262 is pulled or drawn downwardly (relative to the orientation of FIG. 23A) on to the lid 260, promoting a liquid-tight seal between the components. The undercuts 330*a*, 330*b*, 430*a*, 430*b* act as end stops to rotational motion of the adaptor 262 relative to the lid 260 (and/or vice-versa).

Engagement between corresponding ones of the lid undercuts 330*a*, 330*b* and the adaptor undercuts 430*a*, 430*b* enhances retention of the adaptor 262 to the lid 260 as otherwise provided by the locked interface between the lock structure 412*a*, 412*b* and corresponding retention member 312*a*, 312*b*; further, interface between the lid connector structure 320 and the adaptor connector structure 420 provides stability of the lid 260 on the adaptor 262 (and vice-versa) in an axis perpendicular to the longitudinal axis L. The ramping geometry of the connector structures 320, 420 facilitates uncoupling of the lid 260 from the adaptor 262 through axial rotation in some embodiments. In this regard, it will be recalled that in some embodiments, sealing features can be provided that promote a liquid-tight seal between the lid 260 and the adaptor 262 in the locked state. The liquid-tight seal can be difficult to break; however, as the adaptor 262 is rotated relative to the lid 260 from the locked state (and/or vice-versa), the adaptor 262 is ramped up and off of the sealing feature, aiding in removing the adaptor 262 from the lid 260.

While the above descriptions have provided the complementary second connection format 254 (FIG. 14) as part of the adaptor 262, other configurations are also acceptable. For example, the second connection format 254 can be permanently assembled to or provided as an integral part of a spray gun (e.g., the second connection format 254 as described above can be provided as or at the inlet port 48 (FIG. 1) of the spray gun 30 (FIG. 1)).

Figure 24:
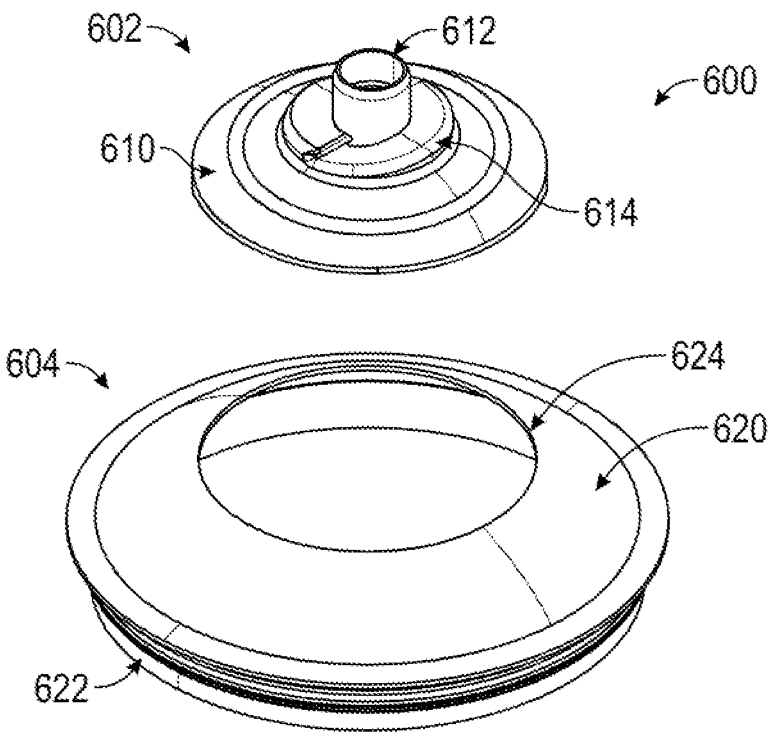
FIG. 24 is an exploded perspective view of a modular lid assembly incorporating a connection format in accordance with principles of the present disclosure.

Any of the complementary connection formats described in the present disclosure may be formed integrally with a remainder of the corresponding lid. Alternatively, these components may be initially formed as a separate, modular part or assembly comprising connection geometry to permit connection to a remainder of the lid. For example, a modular lid assembly 600 is shown in FIG. 24 and includes a modular liquid outlet 602 and a modular lid base 604. The modular components 602, 604 are separately formed and subsequently assembled. In general terms, the modular liquid outlet 602 includes a stage 610, a liquid outlet 612 and components of a connection format 614 (referenced generally). The stage 610 is sized and shaped in accordance with a corresponding feature of the modular lid base 604 described below, and supports the liquid outlet 612 and the connection format 614. The liquid outlet 612 and the connection format 614 can assume any of the forms described above, and in the non-limiting example of FIG. 24, can be the first connection format 56 (FIG. 4A) as described above. Any other connection format described herein can alternatively be incorporated into the modular liquid outlet 602.

The modular lid base 604 generally includes a wall 620 and a rim 622 projecting from the wall 620. The wall 620 forms a central opening 624, and is sized and shaped in accordance with a size and shape of the stage 610. The central opening 624 can assume various shapes and sizes, but is generally configured such that an outer diameter of the opening 624 is greater than an inner diameter of the liquid outlet 612, and less than an outer diameter of the stage 610.

Assembly of the modular lid assembly 600 includes securing the stage 610 on to the wall 620, with the central opening 624 being open to the liquid outlet 612. The modular liquid outlet 602 is secured to the modular lid base 604 by way of welding and/or an adhesive or the like in some embodiments. In some embodiments, the adhesive joint and/or weld joint act to both retain and create a liquid-tight seal upon assembly of the modular liquid outlet 602 to the modular lid base 604. Other attachment techniques are also acceptable, such as quarter turn locking, provision of mechanical locking mechanisms, threaded, snap fit, other mechanical fasteners (e.g., screws, rivets and/or molded posts that are cold formed/hot formed and mushroomed down to hold/retain the component(s) in place and provide a suitable leak-proof seal).

Constructing the lid 600 using a modular liquid outlet 602 and a modular lid base 604 can provide an advantage of allowing more complex geometries to be feasibly created than may otherwise be possible using, e.g., injection molding. For example, in a given lid 600, it may be impossible to form a particular geometry in an injection molded part due to the locations of mold parting lies and the necessary trajectory of slides required to form certain features. However, if the lid 600 is split into modular components, tooling can be designed to directly access surfaces of each modular component that would not have been accessible on the one-piece lid. Thus, further geometric complexity can be achieved. In other embodiments, a modular kit can be provided, including two or more differently-formatted modular lid outlets that are color coded for particular end-use applications.

The modular lid components 602, 604 may also be constructed of different materials as desirable for the application. For example, it may be desirable to use an engineering plastic for the modular liquid outlet 602 (due the strength and tolerances required for a secure and durable connection to the spray gun), while lower cost polymers could be used for the modular lid base 604.

In other embodiments, the modular liquid outlet 602 provided as above could alternatively be attached or preassembled to the end of a paint supply line or pouch etc. and in turn connected to the spray gun paint inlet port. In this way, paint could be supplied directly to the spray gun without the need for the modular lid base 504 (or other reservoir components).

The spray gun reservoir connector systems of the present disclosure provide a marked improvement over previous designs. By locating various components of the connector formats outside or apart from the liquid outlet (or spout) formed by the lid, an inner diameter of the spout can be increased as compared to conventional designs. This, in turn, may improve flow rates through the spout. Further, the connector systems of the present disclosure lower a center of gravity of the reservoir relative to the spray gun as compared to conventional designs. Also, a more stable and robust connection is provided, minimizing possible "teetering" of the reservoir relative to the spray gun during a spraying operation.

Although the present disclosure has been described with reference to preferred embodiments, workers skilled in the art will recognize that changes can be made in form and detail without departing from the spirit and scope of the present disclosure.

What is claimed is:

1. A system comprising:
an adaptor comprising:
a tubular member surrounding a central axis, a first centerline plane passes through the central axis;
a first connection format compatible with a spray gun inlet, the first connection format comprising:
a platform extending radially away from the tubular member;
a first retention feature and a second retention feature each comprising an arm and a tab, the arm projects upwardly from the platform; and
a connector structure projecting upwardly from the platform and parallel to the central axis and configured to engage with the spray gun inlet having a second connection format, wherein the connector structure is distinct from the first retention feature and the second retention feature; and
a spray gun comprising the spray gun inlet, the second connection format of the spray gun inlet comprising:
an outer face extending away from a liquid port;
a second centerline plane passing through a longitudinal axis defined by the liquid port; and
an attachment plane defined orthogonally to the longitudinal axis and the second centerline plane;
wherein the outer face comprises a third retention feature extending away from the second centerline plane and generally parallel to the attachment plane, and
wherein the third retention feature comprises an axial retention surface disposed at an acute angle relative to the attachment plane such that a trapping region is formed between the axial retention surface and the outer face, and
wherein the trapping region forms an undercut that extends away from the longitudinal axis and the second centerline plane;
wherein the connector structure is configured to engage with the outer face of the second connection format.

2. The system of claim 1, wherein the second connection format further comprises:
a first lock structure, and
a second lock structure;
wherein the first retention feature is configured to engage with the first lock structure and the second retention feature is configured to engage with the second lock structure.

3. The system of claim 2, wherein the first retention feature and the first lock structure are configured such that the first retention feature selectively engages the first lock structure upon rotation of the adaptor and the spray gun inlet relative to one another about the longitudinal axis.

4. The system of claim 2, wherein the shape of a peripheral edge of the first lock structure promotes coupling and un-coupling of the first lock structure.

5. A method of attaching an adaptor to a spray gun inlet, comprising:
providing an adaptor, wherein the adaptor comprises:
a tubular member surrounding a central axis, a first centerline plane passes through the central axis;
a first connection format compatible with a spray gun inlet, the first connection format comprising:
a platform extending radially away from the tubular member;
a first retention feature and a second retention feature each comprising an arm and a tab, the arm projects upwardly from the platform; and
a connector structure projecting upwardly from the platform and parallel to the central axis and configured to engage with the spray gun inlet having a second connection format, wherein the connector structure is distinct from the first retention feature and the second retention feature;
aligning a longitudinal axis of the spray gun inlet with the central axis of the adaptor; and
engaging the first retention feature and second retention feature of the adaptor with a first lock structure and a second lock structure provided with the spray gun inlet, wherein engaging the first retention feature and the second retention feature comprises rotating the first retention feature towards the first lock structure which directs a leading side of the first lock structure toward a first end of the first retention member and a leading side of the second lock structure toward a first end of the second retention member;

wherein the second connection format of the spray gun inlet comprises:

an outer face extending away from a liquid port;

a second centerline plane passing through a longitudinal axis defined by the liquid port; and an attachment plane defined orthogonally to the longitudinal axis and the second centerline plane;

wherein the outer face comprises a third retention feature extending away from the second centerline plane and generally parallel to the attachment plane, and wherein the third retention feature comprises an axial retention surface disposed at an acute angle relative to the attachment plane such that a trapping region is formed between the axial retention surface and the outer face, and wherein the trapping region forms an undercut that extends away from the longitudinal axis and the second centerline plane;

wherein the connector structure is configured to engage with the outer face of the second connection format.

6. The method of claim 5, wherein engaging the first retention feature and the second retention feature comprises rotating the first retention feature towards the first lock structure which directs a leading side of the first lock structure toward a first end of the first retention member and a leading side of the second lock structure toward a first end of the second retention member.

* * * * *